US011405207B2

(12) United States Patent
Dunjic et al.

(10) Patent No.: US 11,405,207 B2
(45) Date of Patent: Aug. 2, 2022

(54) DYNAMIC IMPLEMENTATION AND MANAGEMENT OF HASH-BASED CONSENT AND PERMISSIONING PROTOCOLS

(71) Applicant: The Toronto-Dominion Bank, Toronto (CA)

(72) Inventors: Milos Dunjic, Oakville (CA); Arthur Carroll Chow, Markham (CA); David Samuel Tax, Toronto (CA); Armon Rouhani, Toronto (CA); Keith Sanjay Ajmani, Toronto (CA); Gregory Albert Kliewer, Barrie (CA); Anthony Haituyen Nguyen, Toronto (CA); Martin Albert Lozon, London (CA); Kareem El-Onsi, Toronto (CA); Ashkan Alavi-Harati, Markham (CA); Arun Victor Jagga, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 195 days.

(21) Appl. No.: 16/528,164

(22) Filed: Jul. 31, 2019

(65) Prior Publication Data

US 2021/0036854 A1 Feb. 4, 2021

(51) Int. Cl.
*H04L 9/32* (2006.01)
*H04L 9/06* (2006.01)

(52) U.S. Cl.
CPC .......... *H04L 9/3213* (2013.01); *H04L 9/0637* (2013.01); *H04L 9/3242* (2013.01)

(58) Field of Classification Search
CPC ............. H04L 63/0884; H04L 63/0815; H04L 63/0823; H04L 63/062; H04L 63/0853;
(Continued)

(56) References Cited

U.S. PATENT DOCUMENTS 8,505,084 B2 6/2013 Shkula et al.
9,148,429 B2 9/2015 Caims et al.
(Continued)

OTHER PUBLICATIONS

Reis, "Securely Consume APIs on Mobile Devices—Part 2," CA for Developers, May 4, 2018 (9 pages).
(Continued)

*Primary Examiner* — Abu S Sholeman
(74) *Attorney, Agent, or Firm* — Duane Morris LLP

(57) ABSTRACT

The disclosed exemplary embodiments include computer-implemented systems, apparatuses, and processes that dynamically implement and manage hash-based consent and permissioning protocols. By way of example, an apparatus may obtain consent data that identifies one or more elements of data accessible to an application program executed by a device. The apparatus may generate a consent document for the application program based on at least a portion of the consent data, and may compute a consent hash value representative of the consent document. The apparatus may also generate and transmit permissioning data that includes at least the consent hash value to the device. The permissioning data may, for example, include information that instructs the executed application program to store the consent hash value within a local memory of the device and to associate the consent hash value with an access token of the executed application program.

20 Claims, 15 Drawing Sheets

(58) Field of Classification Search

CPC . H04L 63/0428; H04L 9/3247; H04L 9/3213; H04L 9/30; H04L 9/0637; H04W 12/0802; H04W 12/04033

See application file for complete search history.

(56) References Cited

U.S. PATENT DOCUMENTS

| | | | | |
|---|---|---|---|---|
| 9,246,887 | B1 | 1/2016 | Satish et al. | |
| 9,330,280 | B2 | 3/2016 | Rachelwar et al. | |
| 9,473,480 | B2 | 10/2016 | Mason et al. | |
| 9,552,444 | B2 | 1/2017 | Smith et al. | |
| 9,603,011 | B1 | 3/2017 | Flowerday et al. | |
| 9,699,170 | B2 | 4/2017 | Sondhi et al. | |
| 9,754,086 | B1 | 5/2017 | Han et al. | |
| 9,621,357 | B2 | 11/2017 | Williams et al. | |
| 10,038,726 | B2 | 7/2018 | Gaddam et al. | |
| 10,163,153 | B1 * | 12/2018 | Constantine | G06Q 40/00 |
| 2003/0078880 | A1 * | 4/2003 | Alley | G06Q 40/025 705/38 |
| 2012/0254320 | A1 | 10/2012 | Dove et al. | |
| 2013/0173642 | A1 * | 7/2013 | Oliver | G06F 40/20 707/756 |
| 2014/0189799 | A1 | 7/2014 | Lu et al. | |
| 2014/0245417 | A1 | 8/2014 | Hu et al. | |
| 2014/0351368 | A1 * | 11/2014 | Dudziak | H04W 12/084 709/217 |
| 2016/0028737 | A1 * | 1/2016 | Srinivasan | H04L 63/102 726/1 |
| 2016/0234209 | A1 | 8/2016 | Kahol et al. | |
| 2018/0300307 | A1 * | 10/2018 | Oliver | G06F 40/20 |
| 2019/0034602 | A1 * | 1/2019 | Votaw | H04W 12/06 |
| 2019/0087893 | A1 * | 3/2019 | Pellew | G06Q 20/3825 |

OTHER PUBLICATIONS

Jeyasudha et al., "MobiAuth: A new way for mobile authentication & authorization into third party websites," Journal of Chemical and Pharmaceutical Sciences, vol. 8, Iss. 4, 2016, pp. 3204-3207.

* cited by examiner

DYNAMIC IMPLEMENTATION AND MANAGEMENT OF HASH-BASED CONSENT AND PERMISSIONING PROTOCOLS

TECHNICAL FIELD

The disclosed embodiments generally relate to computer-implemented systems and processes that dynamically implement and manage hash-based consent and permissioning protocols.

BACKGROUND

Many computing environments include multiple, network-connected devices and systems that maintain, access, or distribute confidential data across various communications networks. For example, in an open banking environment, these computing systems may maintain programmatic interfaces capable of establishing communications, and exchanging data, with one or more third-party applications executed by additional network-connected devices and systems. For example, a third-party application, such as an executable financial management application, may access elements of confidential customer and account data maintained on behalf of a customer by computing systems of one or more financial institutions, and may perform operations to process, aggregate, or display portions of the obtained customer and account data on a digital interface, e.g., via the customer's mobile device.

SUMMARY

In some examples, an apparatus includes a communications interface, a memory storing instructions, and at least one processor coupled to the communications interface and the memory. The at least one processor is configured to execute the instructions to obtain consent data that identifies one or more elements of data accessible to an application program executed by a device, generate a consent document for the application program based on at least a portion of the consent data, and compute a consent hash value representative of the consent document. The at least one processor is further configured to generate and transmit, via the communications interface, permissioning data that includes the consent hash value to the device. The permissioning data includes information that instructs the executed application program to store the consent hash value within a local memory of the device and to associate the consent hash value with an access token of the executed application program.

In other examples, a computer-implemented method, includes obtaining, using at least one processor, consent data that identifies one or more elements of data accessible to an application program executed by a device, and using the at least one processor, generating a consent document for the application program based on at least a portion of the consent data and computing a hash value representative of the consent document. The computer-implemented method also includes generating and transmitting, using the at least one processor, permissioning data that includes the consent hash value to the device. The permissioning data includes information that instructs the executed application program to store the consent hash value within a local memory of the device and to associate the consent hash value with an access token of the executed application program.

Further, in some examples, an apparatus includes a communications interface, a memory storing instructions, and at least one processor coupled to the communications interface and to the memory. The at least one processor is configured to execute the instructions to receive, via the communications interface, a request for an element of data from a device. The request is generated by an application program executed at the device, and the request includes a first consent hash value. The at least one processor is further configured to obtain a consent document associated with the application program and a second consent hash value representative of the consent document, determine that the first consent hash value corresponds to the second consent hash value, and determine that requested data element is accessible to the application program based on the consent document. Further, the at least one processor is configured to load the requested data element from the memory, encrypt the requested data element, and transmit the encrypted data element to the device via the communications interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
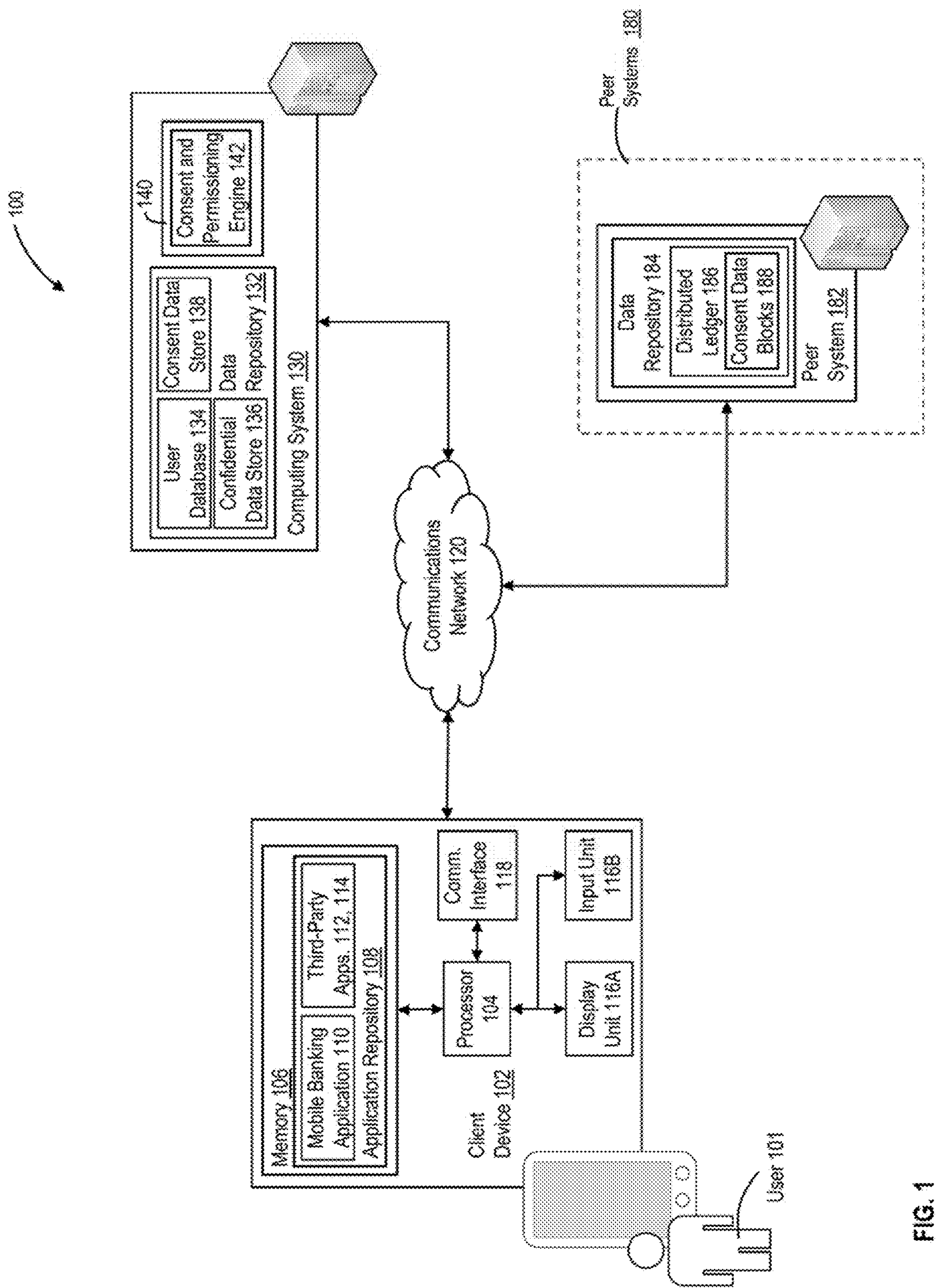
FIG. 1 is a block diagram of an exemplary computing environment, in accordance with some embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

I. Exemplary Computing Environments

FIG. 1 illustrates components of an exemplary computing environment 100, in accordance with some exemplary embodiments. As illustrated in FIG. 1, environment 100 may include one or more computing devices, such as client device 102 operated by a user 101, and one or more computing systems, such as computing system 130. Environment 100 may also include one or more peer systems 180, such as, but not limited to, peer system 182. In some instances, each of client device 102, computing system 130, and peer systems 180 (including peer system 182) may be interconnected across one or more wired or wireless communications networks, such as communications network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories that store data and/or software instructions, such as memory 106, and one or more processors, such as processor 104, configured to execute the software instructions. As described herein, client device 102 may be associated with or operated by a user, such as user 101, and examples of client device 102 include, but are not limited to, as a smart phone, tablet computer, a desktop computer, a gaming console, a wearable device, or another computing device, system, or apparatus associated with user 101.

The one or more tangible, non-transitory memories of client device 102 may store application programs, application modules, and other elements of code executable by the one or more processors. For example, as illustrated in FIG. 1, client device 102 may maintain, within memory 106, an application repository 108 that includes, among other things, an executable mobile banking application 110 and one or more executable third-party applications, such as executable third-party applications 112 and 114. In some instances, executable mobile banking application 110 may be provisioned to client device 102 by a computing system operated by, or associated with, a financial institution that provides financial services to user 101, e.g., computing system 130.

Further, each of the executable third-party applications, including executable third-party applications 112 and 114, may be developed by and provisioned to client device 102 by one or more computing systems operated by, or associated with, a corresponding third-party entity (not illustrated in FIG. 1). Examples of third-party applications 112 and 114 include, but are not limited to, a financial management application, an third-party financial aggregator application, and another application that, when executed by processor 104, requests elements of confidential data maintained on behalf of user 101 by one or more computing systems operating within environment 100, such as computing system 130, and processes, aggregates, or displays portions of the requested elements of the confidential data within a corresponding digital interface.

Client device 102 may include a display unit 116A configured to present interface elements to user 101, and an input unit 116B configured to receive input from a user of client device 102, such as user 101. Display unit 116A may include, but is not limited to, an LCD display unit or other appropriate type of display unit, and input unit 116B may include, but is not limited to, a keypad, keyboard, touchscreen, fingerprint scanner, voice activated control technologies, stylus, or any other appropriate type of input unit. Further, in some examples, the functionalities of display unit 116A and input unit 116B may be combined into a single device, such as a pressure-sensitive touchscreen display unit that can present elements (e.g., a graphical user interface) and can detect an input from user 101 via a physical touch. Client device 102 may also include a communications interface 118, such as a transceiver device, coupled to processor 104 and configured to establish and maintain communications with communications network 120 via one or more appropriate communications protocols.

Referring back to FIG. 1, each of computing system 130 and peer systems 180 (including peer system 182) may represent a computing system that includes one or more servers and one or more tangible, non-transitory memory devices storing executable code and application modules. The one or more servers may each include one or more processors, which may be configured to execute portions of the stored code or application modules to perform operations consistent with the disclosed embodiments. Further, in some examples, each of computing system 130 and peer systems 180 (including peer system 182) may include a communications unit or interface coupled to the one or more processors for accommodating wired or wireless communication across network 120 with any of the additional network-connected systems or devices described herein, e.g., a transceiver device.

In some instances, each of computing system 130 and peer systems 180 (including peer system 182) may correspond to a discrete computing system, as described herein. In other instances, one or more of computing system 130 and peer systems 180 (including peer system 182) may correspond to a distributed system that includes computing components distributed across one or more networks, such as communications network 120, or other networks, such as those provided or maintained by cloud-service providers (e.g., Google Cloud™, Microsoft Azure™, etc.). The disclosed embodiments are, however, not limited to these exemplary distributed systems and, in other instances, computing system 130 and peer systems 180 (including peer system 182) may include computing components disposed within any additional or alternate number or type of computing systems or across any appropriate network.

In some instances, computing system 130 may maintain elements of confidential data within the one or more tangible, non-transitory memories, e.g., confidential data maintained on behalf of user 101. For example, computing system 130 may be associated with, or may be operated by, a financial institution that provides financial services to user 101 and other customers, and the confidential data may include, among other things, confidential profile data that characterizes user 101, account data identifying and characterizing one or more financial services accounts or payment instruments held by user 101, or transaction data identifying and characterizing one or more transactions involving the financial services accounts or payment instruments.

In some instances, computing system 130 may perform any of the exemplary processes described herein to provision one or more elements of confidential data requested by executed third-party applications 112 or 114 in accordance with a type or level of consent previously granted by user 101 (e.g., through the exemplary processes described herein), To facilitate a performance of these and other exemplary processes, such as those described herein, computing system 130 may maintain, within one or more tangible, non-transitory memories, a data repository 132 that includes a user database 134, a confidential data store 136, and a consent data store 138.

For example, user database 134 may include data records that identify and characterize one or more users of computing system 130, e.g., user 101. For example, and for each of the users, the data records of user database 134 may include a corresponding user identifier (e.g., an alphanumeric login credential assigned to user 101 by computing system 130), and data that uniquely identifies one or more devices (such as client device 102) associated with or operated by that user (e.g., a unique device identifier, such as an IP address, a MAC address, a mobile telephone number, etc., that identifies client device 102).

Confidential data store 136 may maintain elements of confidential customer data on behalf of user 101 and other users of computing system 130. For example, confidential data store 136 may include confidential account data and confidential transaction data that identify and characterize a balance or transaction history of one or more payment instruments, deposit accounts, brokerage accounts, or other financial services accounts issued to user 101 (e.g., by the financial institution that operates computing system 130). Further, and by way of example, one or more data records of confidential data store 136 may also include customer profile data that identifies and characterizes user 101, such as, but not limited to, a name or an address of user 101, one or more governmental identifiers of user 101 (e.g., a driver's license number, a social security number, etc.), and demographic data that characterizes user 101 (e.g., an age, a gender, an income level, etc.). In some instances, each of the data records of confidential data store 136 may also include a corresponding user identifier (e.g., an alphanumeric login credential assigned to user 101 by computing system 130) and/or a corresponding device identifier (e.g., the IP address, MAC address, or mobile telephone number of client device 102), and as such, each of the data records confidential data store 136 may also be linked to, and associated with, one or more corresponding data records within user database 134.

Consent data store 138 may maintain, for one or more third-party applications, such as third-party application 112, information indicative of a successful outcome of one or more of the exemplary decoupled consent and permissioning protocols described herein, which may be implemented collectively by client device 102 (e.g., though executed mobile banking application 110, executed third-party application 112, and additionally, or alternatively, executed third-party application 114, etc.) and computing system 130 (e.g., through an executed consent and permissioning engine). By way of example, consent data store 138 may maintain, on behalf of mobile banking application 1110 and third-party applications 112 and 114, a digital token, cryptogram, hash value, or other element of cryptographic data, e.g., an OAuth token, indicative of a permission of each of these executed applications programs to access programmatic interfaces established and maintained by computing system 130.

Further, consent data store 138 may also maintain elements of application-specific information that identifies and characterizes a level of access to confidential data (e.g., as maintained in confidential data store 136) granted to third-party applications 112 and 114 by user 101, e.g., via any of the exemplary decoupled consent and permissioning processes described herein. For example, and for each of third-party applications 112 and 114 (and any additional or alternate third-party application executed by client device 102), the elements of application-specific information may include: (i) a consent document that, among other things, includes data identifying one or more accessible types, classes, or elements of confidential data maintained at computing system 130, and data identifying one or more permissible operations on the accessible types, classes, or elements of confidential data; and (ii) a consent hash value representative of the consent document. In some instances, each of the elements of application-specific permissioning data (e.g., the consent document, the consent hash value, etc.) may be linked to or associated with a corresponding one of the application-specific OAuth tokens and a unique application identifier within the data records of consent data store 138.

The application-specific consent documents may, for example, be formatted in accordance with a data-interchange format, examples of which include, but are not limited to, a JavaScript Object Notation (JSON) format, a YAML format, an Internet-JSON (I-JSON) format, an XML format, or any additional or alternate language-independent, data serialization formats compatible with application programs executed by client device 102 and computing system 130. Further, the application-specific consent hash values may represent a cryptographically secure, and tamper-evident, attestation of the level of access currently granted to corresponding ones of third-party applications 112 and 114 (and other third-party applications executable at client device 102).

In some instances, one or more of the application-specific consent hash values may include a cryptographic hash value representative of the corresponding one of the application-specific consent documents, and computing system 130 may generate the cryptographic hash value based on an application of one or more cryptographic hash functions to the corresponding one of the application-specific consent documents, either alone or in combination with additional data. Examples of the cryptographic hash functions includes, but are not limited to, a secure hash algorithm (SHA), such as SHA-1, SHA-2, or SHA-256, and an MD5 algorithm. In other examples, one or more of the application-specific consent hash values may include a non-cryptographic hash value, and computing system 130 may generate the non-cryptographic hash value based on an application of one or more of a non-cryptographic hash function or a universal hash function to the corresponding one of the application-specific consent documents, either alone or in combination with additional data.

Referring back to FIG. 1, computing system 130 may also maintain, within the one or more tangible, non-transitory memories, one or more executable application programs 140, such as, but not limited to a consent and permissioning engine 142. When executed by the one or more processors of computing system 130, consent and permissioning engine 142 may perform operations that, in conjunction with one or more application programs executed at client device 102 (e.g., executed mobile banking application 110, executed third-party applications 112 or 114, etc.), collectively implement one or more of the exemplary, decoupled consent and permissioning protocols described herein, which may decouple processes that establish permission of one or more executed third-party applications to access a programmatic interface established and maintained at computing system 130 from those processes that grant, and selectively modify or revoke, permission to each of the third-party applications to access elements of confidential data on an application-specific basis.

Referring back to FIG. 1, each of peer systems 180, such as peer system 182, may maintain, within one or more tangible, non-transitory memories, a data repository 184 that includes a local copy of a cryptographically secure distributed ledger 186, which peer systems 180 (including peer system 182) may establish and maintain using any of the exemplary consensus-based processes described herein. In some instances, as illustrated in FIG. 1, distributed ledger 186 may include ledger blocks, such as consent ledger blocks 188, that record OAuth tokens, consent documents, and additionally, or alternatively, hash values representative of the consent documents for one or more third-party applications provisioned to computing devices and systems operating within environment 100, such as, but not limited to, third-party application 112 provisioned to client device 102.

For example, consent ledger blocks 188 may establish an immutable and cryptographically secure record of a temporal evolution in a type or level of consent granted to third-party application by user 101. Further, in some instances, peer systems 180 may perform any of the exemplary, consensus-based processes described herein to broadcast distributed ledger 186 (and updates thereto) across network 120 to one or more computer systems or devices that participate in a corresponding distributed-ledger network, such as computing system 130.

Figure 2A:
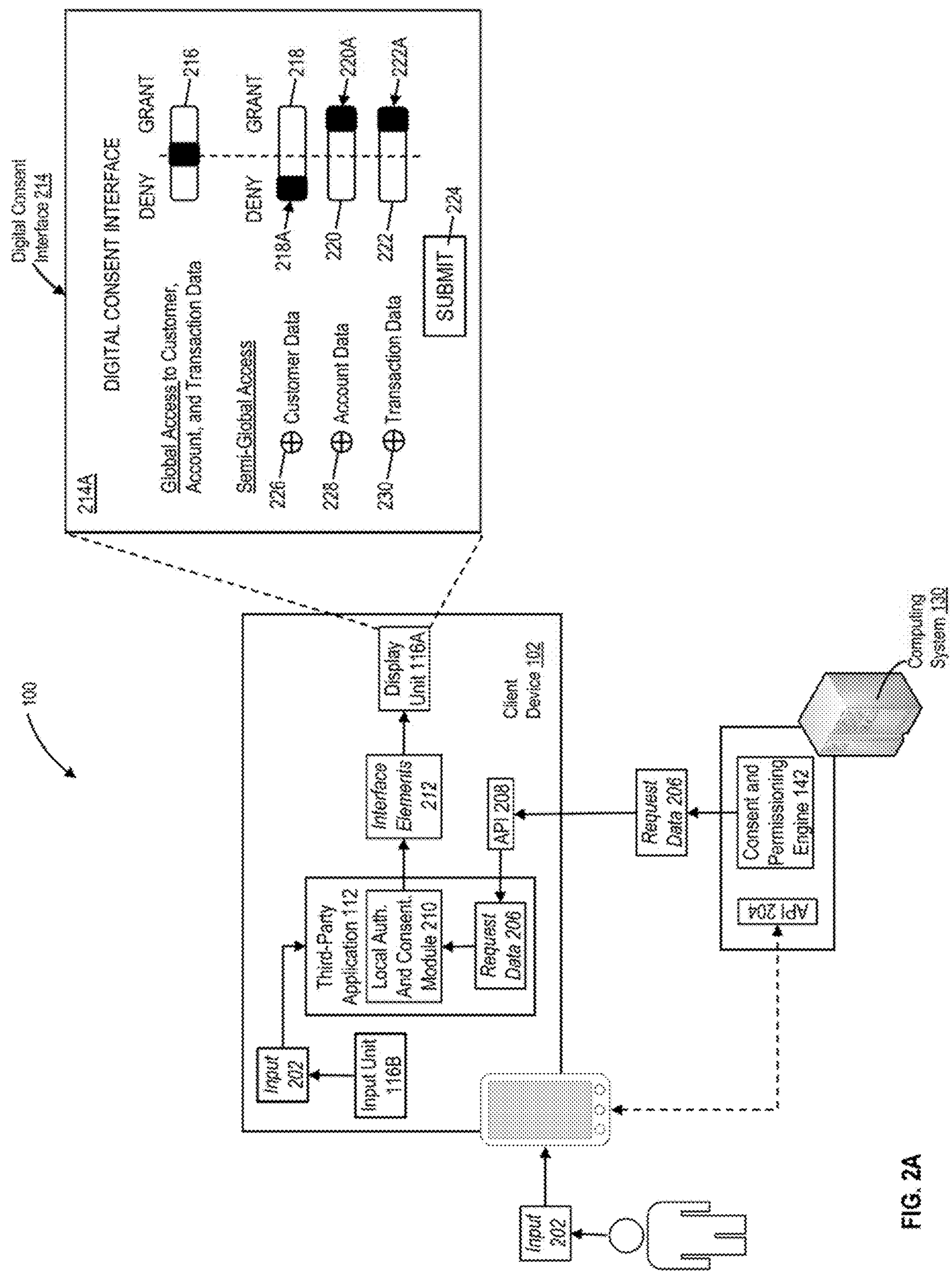
FIG. 2A is a diagram illustrating a portion of an exemplary computing environment, in accordance with some embodiments.

II. Exemplary Processes for Dynamically Implementing and Managing Hash-Based Consent and Permissioning Protocols FIG. 2A illustrate a portion of computing environment 100, in accordance with some exemplary embodiments. Referring to FIG. 2A, user 101 may provide, to input unit 1168 of client device 102, input 202 that requests an execution of a third-party application program provisioned to client device 102, such as third-party application 112 (or alternatively, third-party application 114). For example, and based on input 202, client device 102 may execute third-party application 112, and executed third-party application 112 may perform operations that establish a secure channel of communications with one or more computing systems within environment 100 that maintain elements of confidential data on behalf of user 101. As described herein, computing system 130 may maintain elements of confidential data on behalf of user 101 and other customers or users, and executed third-party application 112 may perform operations that establish the secure channel of communications with a programmatic interface established and maintained by computing system 130, e.g., application programming interface (API) 204.

In some instances, and responsive to the establishment of the secure communications channel, executed third-party application 112 may generate one or more interface elements that, when rendered for presentation by display unit 116A, collectively establish one or more display screens of a digital authentication interface (not illustrated in FIG. 2A). The digital authentication interface may prompt user 101 to provide, via input unit 116B, one or more authentication credentials that uniquely identify user 101 at computing system 130, such as, but not limited to, an alphanumeric login credential, an alphanumeric password, or one or more biometric credentials, such as a digital image of a face of user 101 or a digital scan of a thumbprint or fingerprint of user 101. In some instances, executed third-party application 112 may receive the one or more authentication credentials, e.g., via input unit 116B, and may package the one or more authentication credentials and a unique device identifier of client device 102 (e.g., an IP address, a MAC address, etc.) into corresponding portions of authentication data, which client device 102 may transmit across network 120 to computing system 130.

Although not illustrated in FIG. 2A, API 204 may receive and route the authentication data to consent and permissioning engine 142, which upon execution by computing system 130, may parse the authentication data to extract the one or more authentication credentials of user 101 and the device identifier of client device 102. In some instances, executed consent and permissioning engine 142 may access one or more local authentication credentials maintained within an accessible data repository (e.g., within user database 134 of data repository 132), and authenticate an identity of user 101 based on a comparison between the extracted authentication credentials and the accessed local authentication credentials.

If, for example, executed consent and permissioning engine 142 were to establish an inconsistency between the extracted and local authentication credentials, executed consent and permissioning engine 142 may decline to authenticate the identity of user 101 and may decline to grant third-party application 112 access to computing system 130. Although not illustrated in FIG. 2A, executed consent and permissioning engine 142 may generate an error message and may perform operations that cause computing system 130 to transmit the error message across network 120 to client device 102, e.g., via a secure, programmatic interface established and maintained by executed third-party application 112.

In other instances, and based on an established consistency between the extracted and local authentication credentials, executed consent and permissioning engine 142 may authenticate an identity of user 101. Responsive to the successful authentication, executed consent and permissioning engine 142 may generate and store confirmation data (e.g., a data flag, etc.) indicative of the successful authentication within an accessible data repository, such as user database 134, in conjunction with the one or more of the authentication credentials of user 101 (e.g., as a user identifier) or the device identifier of client device 102.

Executed consent and permissioning engine 142 may also generate, and transmit, across network 120 to client device 102, request data 206 that requests an initiation of one or more of the exemplary decoupled consent and permissioning protocols described herein, e.g., in conjunction within executed third-party application 112. For example, request data 206 may include unique identifier of computing system 130 (e.g., an assigned internet protocol (IP) address, etc.) or of executed consent and permissioning engine 142 (e.g., a cryptogram, hash value, or other element of cryptographic data that uniquely identifies consent and permissioning engine 142 to executed third-party application 112). Request data 206 may also include information that identifies certain types or classes of confidential data maintained on behalf of user 101 by computing system 130 (e.g., confidential profile, account, or transaction data, etc.), along with certain data elements associated with each of the types or classes (e.g., elements of profile data that include governmental identifiers, elements of transaction data that include transaction times, transaction values, and identifiers of corresponding merchants or purchased products, elements of account data that include account identifiers, account balances, etc.).

A secure programmatic interface established and maintained by executed third-party application 112, such application programming interface (API) 208, may receive request data 206 from computing system 130 and may route request data 206 to executed third-party application 112. In some instances, a local authorization and consent module 210 of executed third-party application 112 may process request data 206 and generate interface elements 212 that, when rendered for presentation by display unit 116A, collectively establish one or more display screens of a digital consent interface 214. The one or more display screens of digital consent interface 214 may prompt user 101 to provide input to client device 102 that specifies whether user 101 grants third-party application 112 permission to access certain types, classes, or discrete elements of the confidential data maintained by computing system 130, e.g., the confidential profile, account, or transaction data maintained on behalf of user 101 by computing system 130.

As illustrated in FIG. 2A, display screen 214A of digital consent interface 214 may prompt user 101 to provide input to client device 102 that grants third-party application 112 access to the elements of confidential data maintained at computing system 130 on a global basis (e.g., to all available types or classes of confidential data), or that selectively grants third-party application 112 access to the elements of confidential data on a semi-global basis (e.g., to a selected subset of the available types or classes of confidential data). For example, display screen 214A may include an interactive interface element, such as slider element 216, that enables user 101 to grant, or deny, third-party application 112 access to each of the elements of the confidential customer data, account data, and transaction data on a global basis. Further, display screen 214A may also include one or more additional interactive elements, such as slider elements 218, 220, and 222, that enable user 101 to grant, or deny, third-party application 112 access to respective elements of the confidential customer data (e.g., slider element 218), the confidential account data (e.g., slider element 220), and the confidential transaction data (e.g., slider element 222), on a semi-global bases, e.g., a class- or type-specific basis.

For example, and based on the input provided to client device 102, e.g., via input unit 116B, user 101 may dispose slider element 218 at position 218A within display screen 214A, which indicates an intention to deny third-party application 112 access to any of the elements of confidential customer data maintained on behalf of user 101 at computing system 130. Additionally, and based on the provided input, user 101 may dispose slider element 220 at position 220A within display screen 214A, and may dispose slider element 222 at position 222A within display screen 214A, which collectively indicate an intention to grant third-party application 112 access to each of the elements of confidential account and transaction maintained on behalf of user 101 at computing system 130. Further, user 101 may elect to provide no input to slider element 216, which indicates user 101's intention to selectively grant third-party application 112 access to the elements of confidential data on a semi-global, and not a global, basis.

Display screen 214A may also include additional interface elements, such as "SUBMIT" element 224, that, when selected by user 101 through the additional provided input, confirm the level of access granted to third-party application 112. In some instances, the selection of "SUBMIT" element 224 (e.g., based on the provided input) may cause executed third-party application 112 perform operations that submit consent data indicative of the granted level of access to computing system 130, e.g., during the exemplary decoupled consent and permissioning protocols described herein.

In other instances, one or more additional display screen of digital consent interface 214 may prompt user 101 to grant, or deny, third-party application 112 access to one or more discrete elements of the types or classes of confidential data identified within display screen 214A, e.g., the confidential customer data, account data, and transaction data maintained at computing system 130. By way of example, as illustrated in FIG. 2A, display screen 214A may include additional interface elements, such as interactive elements 226, 228, and 230, that, when selected by user 101, cause executed third-party application 112 generate and render for presentation additional interface screens facilitating a selective grant or denial of permission for third-party application 112 to access specific elements of the confidential customer data, account data, and transaction data.

For example user 101 may elect to selectively grant, or deny, third-party application 112 access to one or more specific elements of the confidential transaction data maintained by computing system 130, and may provide additional input to client device 102 (e.g., via input unit 116B) that selects interface element 230 within display screen 214A. Responsive to the additional input selecting interface element 230, executed third-party application 112 may access request data 206, e.g., as received from computing system 130, and may generate one or more additional interface elements that, when rendered for presentation within an additional display screen of digital consent interface 214, identify discrete elements of confidential transaction data maintained on behalf of user 101 at computing system 130 and prompt user 101 to selectively grant, or deny, executed third-party application 112 access to one or more of these discrete elements of confidential transaction data.

Figure 2B:
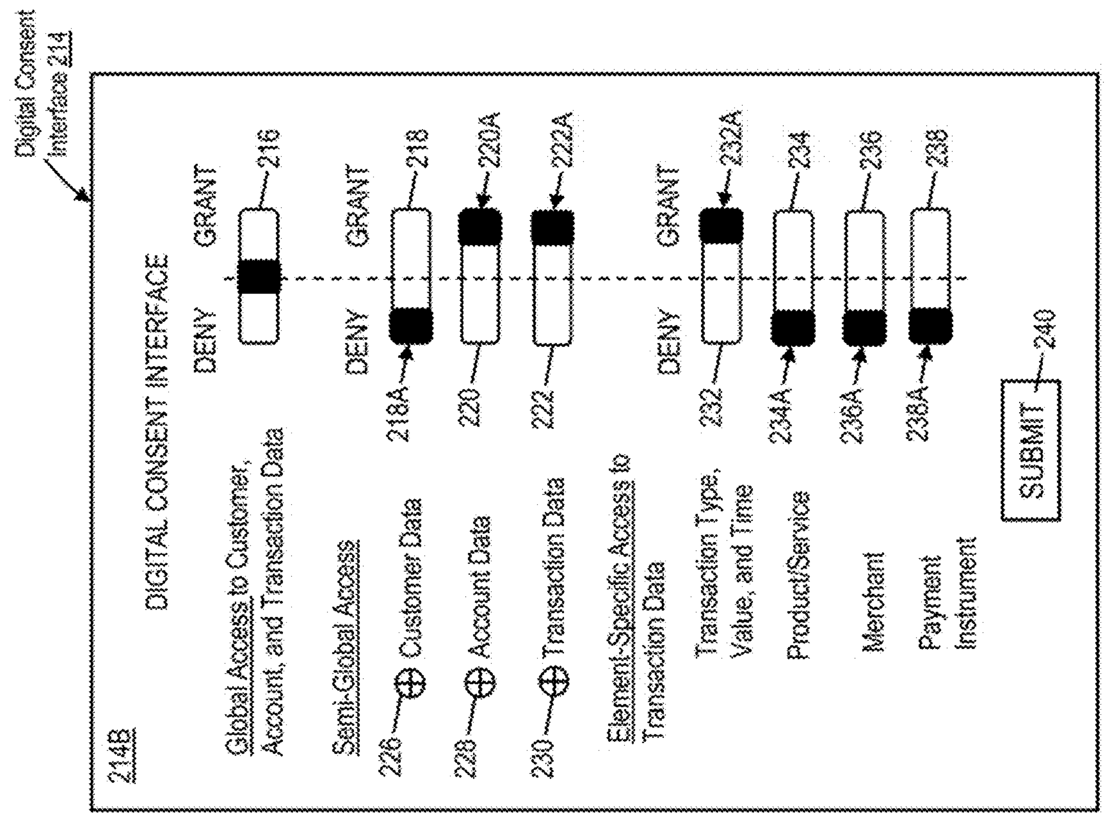
FIG. 2B is a diagram of an exemplary digital interface, in accordance with some embodiments.

Referring to FIG. 2B, and responsive to the additional input selecting interface element 230, executed third-party application 112 may generate and render for presentation a data-specific display screen 214B, which includes interactive interface elements, such as slider elements 232, 234, 236, and 238, that enable user 101 to selectively grant, or deny, third-party application 112 access to (i) a transaction type, value, and time for one or more transactions involving user 101 (e.g., slider element 232); (ii) a product or service involved in the one or more transactions (e.g., slider element 234); (iii) a counterparty or merchant involved in the one or more transactions; and (e.g., slider element 236); and a payment instrument involved in the one or more transactions (e.g., slider element 240). Display screen 214B may also include further interface elements, such as "SUBMIT" element 240, that, when selected by user 101 through the additional provided input, confirm the level of access granted to third-party application 112 (e.g., as described herein in reference to "SUBMIT" element 224).

For example, user 101 may elect to grant third-party application 112 access to the elements of confidential transaction data that identify a type, amount, and date of one or more transactions involving user 101, and may provide further input to client device 102 (e.g., via input unit 116B) that disposes slider element 232 at position 232A within display screen 214B, which indicates an intention to grant third-party application 112 access to the elements of confidential transaction data identifying the type, amount, and date of transactions involving user 101. In other examples, user 101 may elect to deny third-party application 112 access to any elements of confidential transaction data that identify a product or service, a counterparty, or a payment instrument associated with transactions involving user 101. As described herein, user 101 may provide further input to client device 102 (e.g., via input unit 116B) that disposes that disposes slider elements 234, 236, and 238 and respective ones of positions 234A, 236A, and 238A within display screen 214B, which indicates an intention to deny third-party application 112 access to the elements of confidential transaction data identifying the involved product or service, counterparty, and payment instrument. The further provided input may also indicate a selection of "SUBMIT" element 240, which confirms the level of access granted to executed third-party application 112

In other instances, not illustrated in FIG. 2B, user 101 may also elect to selectively grant, or deny, executed third-party application access to one or more discrete elements of confidential customer profile data or confidential account data maintained at computing system 130, and may provide further input to client device 102 (e.g., via input unit 116B) that selects interactive elements 226 or 228 of display screen 214A, which causes executed third-party application 112 to generate and render for presentation additional interface screens facilitating a selective grant or denial of permission for executed third-party application 112 to access discrete elements of the confidential customer profile data or the confidential account data, e.g., using any of the exemplary processes described herein.

The disclosed embodiments are however, not limited to these exemplary interface elements and display screens, and in other instances, digital consent interface 214 may include interface elements associated with any additional or alternate class or type of confidential data maintained on behalf of user 101 (e.g., the profile data or account data described herein) or any additional or alternate elements of these classes or types of confidential data, and may present these interface elements within an additional or alternate display screen of digital consent interface 214, including a single display screen. Further, the disclosed digital interfaces and display screens are not limited to the exemplary types or functions of interface elements described herein (e.g., selectable elements, slider elements, etc.), and into other examples, the disclosed digital interfaces and display screens may include any additional or alternate type of interface element characterized by any additional or alternate functionality, such as, but not limited to, fillable text boxes or check boxes.

Further, in some embodiments, one or more display screens of digital consent interface 214, such as data-specific display screen 214B, may include additional or alternate interface elements that, when selected by user 101 (e.g., based on additional input received via input unit 116B), enable user 101 to permit a performance of one of more operations on selected classes or elements of confidential data by third-party application 112. Examples of these operations can include, but are not limited to, processing or aggregating elements of raw confidential data, presenting the elements of raw, aggregated, or processed confidential data within one or more digital interfaces, and distributing the elements of raw, aggregated, or confidential data to additional computing systems operating within environment 100, or to application programs executed by these additional computing systems (e.g., fourth- or fifth-party applications, etc.).

Figure 2C:
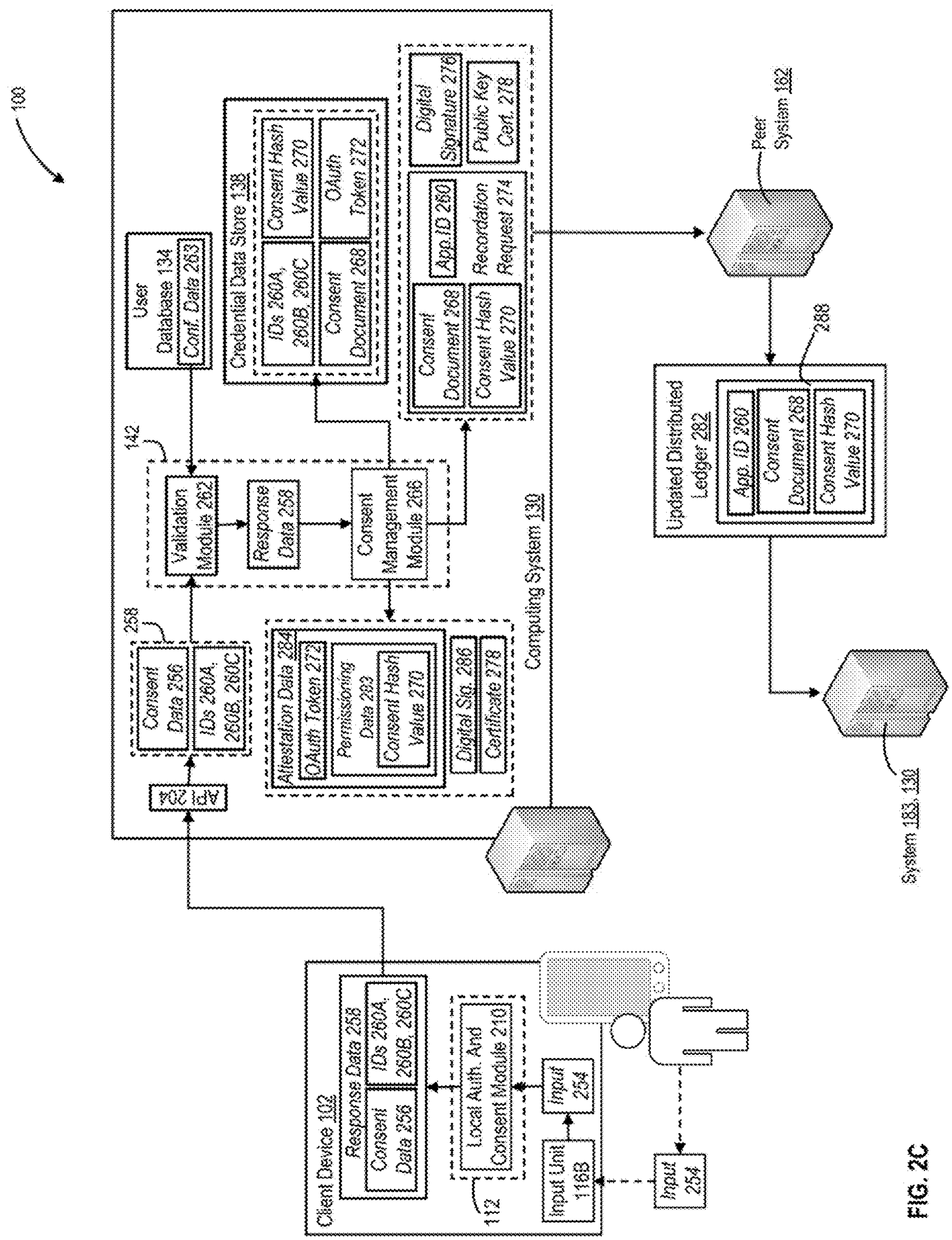
FIGS. 2C-2D, 3A-3B, and 4A-4B are diagrams illustrating portions of an exemplary computing environment, in accordance with some embodiments.

Referring to FIG. 2C, local authorization and consent module 210 may receive the additional input, e.g., additional input 254, via input unit 116B. In some instances, local authorization and consent module 210 may parse additional input 254 perform operations that extract information identifying: (i) the selective disposition of slider element 218 at position 218A of display screen 214A, which indicates a denial of access to the elements of confidential customer data; (ii) the selective disposition of slider element 220 at position 220A of display screen 214A, which indicates a grant of access to the elements of confidential account data; (iii) the selective disposition of slider element 232 at position 232A of display screen 214B, which indicates a grant of access to the elements of confidential transaction data that specify the value, type, or date of the one or more transactions; (iv) the selective disposition of slider elements 234, 236, and 238 at respective ones of positions 234A, 236A, and 238A of display screen 214B, which indicates a denial of access to the elements of confidential transaction data that identify the product or service, counterparty, or payment instrument involved in the one or more transactions. In some instances, the extracted information may also identify the selection of "SUBMIT" element 240, which confirms the level of access granted to executed third-party application 112 by user 101.

Local authorization and consent module 210 may perform operations that package the extracted information into corresponding portions of consent data 256. As illustrated in FIG. 2B, local authorization and consent module 210 may generate response data 258, which includes consent data 256, and perform operations that cause client device 102 to transmit response data 258 across network 120 to API 204 of computing system 130, e.g., as a response to request data 206. Response data 258 may also include at least one of a unique user identifier 260A of user 101 (e.g., an alphanumeric authentication credential, a biometric credential, etc.), a unique device identifier 260B of client device 102 (e.g., an IP address, a MAC address etc.), and a unique application identifier 260C of executed third-party application 112 (e.g., a unique cryptogram, hash value, or other element of cryptographic data, etc.).

API 204 may provide response data 258 as an input to consent and permissioning engine 142, which upon execution, may perform any of the exemplary processes described herein to generate a digital token, cryptogram, hash value, or other element of cryptographic data, e.g., an OAuth token, indicative of the prior successful authentication of user 101, and to generate application-specific elements of information, such as a consent document and a consent hash value, that identify, characterize, and represent the level of access to confidential data granted third-party application 112 by user 101. In some instances, described herein, executed consent and permissioning engine 142 may perform operations that store the OAuth token, consent document, and consent hash value within an accessible data repository, such as consent data store 138, in conjunction with one or more of identifiers 260A, 260B, and 260C.

As illustrated in FIG. 2C, a validation module 262 of executed consent and permissioning engine 142 may receive response data 258 from API 204, and may perform operations that associate response data 258 with a prior and successful authentication of the identity of user 101, e.g., based on one or more of user identifier 260A or device identifier 260B and the confirmation data maintained within user database 134 (e.g., confirmation data 263). Responsive to the association of response data 258 with the prior and successful authentication, executed validation module 262 may provide response data 258 as an input to a consent management module 266 of executed consent and permissioning engine 142.

In some instances, and based on portions of response data 258, executed consent management module 242 may perform any of the exemplary processes described herein to generate a consent document that reflects a level of access granted by user 101 to third-party application 112, e.g., as specified within consent data 256, and to compute one or more hash values representative that consent document. Executed consent management module 242 may also perform any of the exemplary described herein processes to generate a digital access token, cryptogram, hash value, or other element of cryptographic data, such as an OAuth token, indicative of the prior successful authentication of the identity of user 101 and a permission of third-party application to access one or more programmatic interfaces established or maintained by computing system 130.

By way of example, consent data 256 may indicate that user 101 denied third-party application 112 access to elements of confidential customer data maintained at computing system 130, and granted third-party application 112 access to any elements of confidential account data maintained at computing system 130. Further, and as described herein, consent data 256 may also indicate that user 101 granted third-party application 112 access to elements of confidential transaction data characterizing a transaction type, value, and time for one or more transactions involving user 101, while denying access to any elements of confidential transaction data characterizing a payment instrument, a product or service, or a counterparty involved in these transactions.

In some instances, executed consent management module 266 may perform operations that package all or a portion of consent data 256 into corresponding portions of a consent document 268, which as described herein, may be formatted in accordance with a data interchange format. Examples of the data-interchange format include, but are not limited to, a JavaScript Object Notation (JSON) format, a YAML format, an Internet-JSON (I-JSON) format, an XML format, or any additional or alternate language-independent, data serialization formats compatible with executed third-party application, consent and permissioning engine 142, and other application programs executed by client device 102 and computing system 130.

Executed consent management module 266 may also generate a consent hash value 270 representative of consent document 268, e.g., based on an application of any of the hash algorithms described herein to all or a selected portion of consent document 268, either alone or in conjunction within additional data. In some instances, and as described herein, consent hash value 270 may correspond to a cryptographic hash value, e.g., computed using an SHA algorithm or an MD5 algorithm. In other instances, as described herein, consent hash value 270 may corresponding to a non-cryptographic hash value, e.g., computed based on an appropriate non-cryptographic hash algorithm or a universal hash algorithm).

Executed consent management module 266 may perform further operations that generate a digital token, cryptogram, hash value, or other element of cryptographic data, e.g., an OAuth token 272, indicative of the successful authentication of the identity of user 101 and of the permission of third-party application to access one or more programmatic interfaces established or maintained by computing system 130. OAuth token 272 may, in some instances, be characterized by a predetermined structure or format recognizable by executed consent and permissioning engine 142 and further, by executed third-party application 112. In some examples, executed consent management module 242 may generate OAuth token 272 (or any additional or alternate digital token, cryptogram, hash value, or cryptographic data element) based on an application of one or more tokenization processes to portions of consent data 256, user identifier 260A, device identifier 2606, and/or application identifier 260C.

As illustrated in FIG. 2C, executed consent management module 266 may perform operations that store, within consent data store 138, consent document 268, consent hash value 270, and OAuth token 272 in conjunction with user identifier 260A (e.g., which uniquely identifies now-authenticated user 101), device identifier 260B (e.g., which identifies client device 102), and application identifier 260C (e.g., which identifies third-party application 112). In some examples, the storage of consent document 268, consent hash value 270, OAuth token 272, and identifiers 260A, 260B, and 260C within consent data store 138 may associate consent document 268, consent hash value 270, and OAuth token 246 with user 101, with client device 102, and further, with executed third-party application 112. Further, consent document 268 and consent hash value 270 may also establish, and be indicative of, a current attestation by computing system 130 of a level of type of access to confidential data granted third-party application by user 101.

In other examples, executed consent management module 266 may perform operations that package consent document 268, consent hash value 270, and application identifier 260C (e.g., which identifies third-party application 112) into corresponding portions of recordation data 274. Executed consent management module 266 may further apply a digital signature 276 to recordation data 274, e.g., using a private cryptographic key of computing system 130, and may perform operations that cause computing system 130 to broadcast recordation data 274, applied digital signature 276, and a public key certificate 278 of computing system 130 (e.g., that includes a corresponding public cryptographic key) to one or more of peer systems 180, including peer system 182.

A programmatic interface maintained by each of the one or more of peer systems 180, including peer system 182, may receive recordation data 274, and may perform consensus-based operations that validate applied digital signature 276 (e.g., based on the public cryptographic key included within public key certificate 278), that generate an additional ledger block 288 of distributed ledger 186 that includes consent document 268, consent hash value 270, and application identifier 260C (along with an additional hash value representative of these elements of included data), and that compute competitively a proof-of-work or proof-of-stake associated with distributed ledger 186 (e.g., as established based on consensus among peer systems 180). By way of example, peer system 182 may successful compute the associated proof-of-work or proof-of-stake, may generate an updated distributed ledger 282 to which additional ledger block 288 is appended (e.g., a latest, longest version of the distributed ledger), and may broadcast updated distributed ledger 282 across network 120 to additional ones of peer systems 180 and further, to other participants in a distributed-ledger network, such as computing system 130, for storage in one or more tangible, non-transitory memories.

Referring back to FIG. 2C, executed consent management module 266 may perform operations that package OAuth token 272 and permissioning data 283 that identifies and characterizes a level of access granted to executed third-party application 112, such as, but not limited to, consent hash value 270, into corresponding portions of attestation data 284. Further, executed consent management module

266 also apply a digital signature 286 to all or a portion of attestation data 284 using any appropriate digital signature algorithm in conjunction with private cryptographic key of computing system 130 (e.g., to further verify an integrity of attestation data 284 during transmission across unsecured communications channels). Computing system 130 may, for example, perform operations that transmit attestation data 284, digital signature 286, and public key certificate 278 across network 120 to client device 102 using any appropriate communications protocol, e.g., via the corresponding communications interface, such as the transceiver device.

Figure 2D:
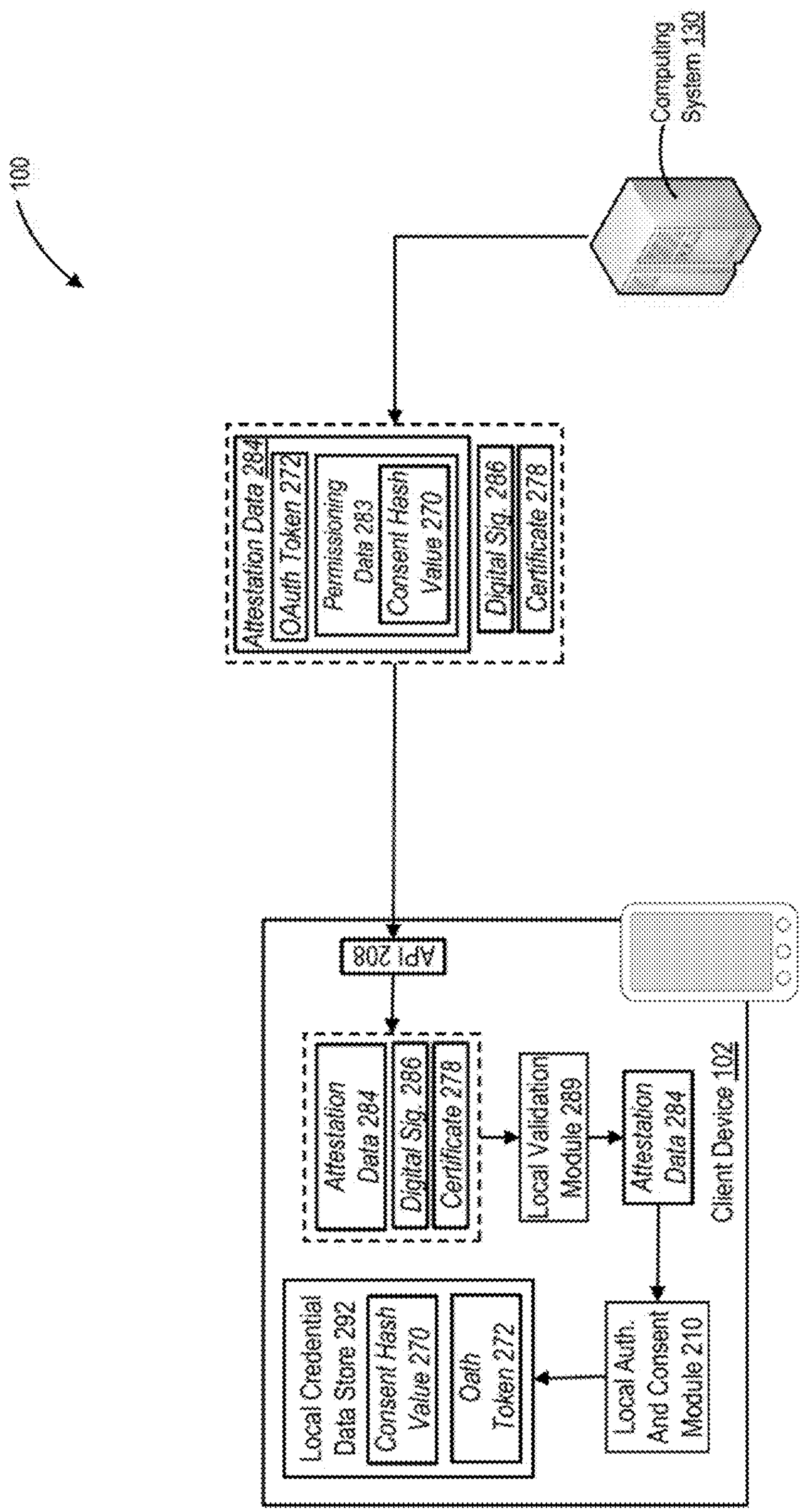

Referring to FIG. 2D, API 208 of executed third-party application 112 may receive and route attestation data 284, digital signature 286, and public key certificate 278 to a local validation module 289 of executed third-party application 112. In some instances, when executed by processor 104, local validation module 289 may perform operations that validate digital signature 286, e.g., based on the public cryptographic key of computing system 130 included within public key certificate 278. Responsive to the successful validation of digital signature 286, executed local validation module 289 may provide a portion of permissioning data 283 (e.g., consent hash value 270) and OAuth token 272 as an input to local authorization and consent module 210, which may store consent hash value 270 and OAuth token 272 within corresponding portions of a local credential data store 292 (e.g., as maintained in memory 106), either alone or in conjunction with public key certificate 278.

As described herein, consent hash value 270 may be representative of consent document 268, which identifies, specifies, and characterizes a level of access to confidential data granted executed third-party application 112 by user 101. In some examples, when provisioned to third-party application 112 and stored within the one or more tangible, non-transitory memories (e.g., within local credential data store 292), consent hash value 270 may correspond to an attestation, by third-party application 112, of a type of access currently granted by user 101. For example, when requesting access to one or more elements of confidential data maintained at computing system 130, executed third-party application 112 may present not only OAuth token 272, which confirms and authentication of an identity of user 101 and an authorization of executed third-party application 112 to access programmatic interfaces maintained at computing system 130, but also consent hash value 270, which enables computing system 130 to establish whether third-party application 112 (e.g., as executed by client device 102) and consent and permissioning engine 142 (e.g., as executed by computing system 130) each attest to a common level or type of granted consent.

Further, and as described herein, attestation data 284 includes permissioning data 283, such as consent hash value 270, that, when provisioned to executed third-party application 112, represents an attestation by third-party application 112 of a current level of access to confidential data granted by user 101 (e.g., using any of the exemplary processes described herein). The disclosed embodiments are, however, not limited to permissioning data that includes consent hash value 270 and in other examples, permissioning data 283 may also include all, or a selected portion, of consent document 268, either alone or in addition to consent hash value 270. In some instances, executed third-party application 112 may perform any of the exemplary processes described herein to validate the applied digital signature, and to store each of these additional elements of permissioning data 283 within corresponding portions of local consent data store 290.

In some instances, one or more of the exemplary consent and permissioning protocols described herein, when implemented collectively by executed third-party application 112 and executed dynamic consent and permissioning engine 142, decouple an authorization of executed third-party application 112 to access computing system 130 through one or more programmatic interfaces (e.g., the generation of OAuth token 272) from the selective grant or denial of access to elements of confidential data maintained by computing system 130 (e.g., the generation of consent document 268 and consent hash value 270). By decoupling authorization from access and consent, one or more of the exemplary processes described herein may enable user 101 to selectively grant, or deny, a third-party application access to elements of confidential data maintained at computing system 130, on a global basis, on a semi-global basis (e.g., on a data-type- or data-class-specific basis), or an element-by-element basis. Certain of these exemplary processes may be implemented in addition to, or as an alternate to, many token-based consent and authorization processes that, in response to a request generated by a third-party application to access elements of confidential data maintained at computing system 130, require user 101 to consent to the requested access to the elements of confidential data without condition, or alternatively, deny the requested access to not only the elements of confidential data, but also to computing system 130.

Figure 3A:
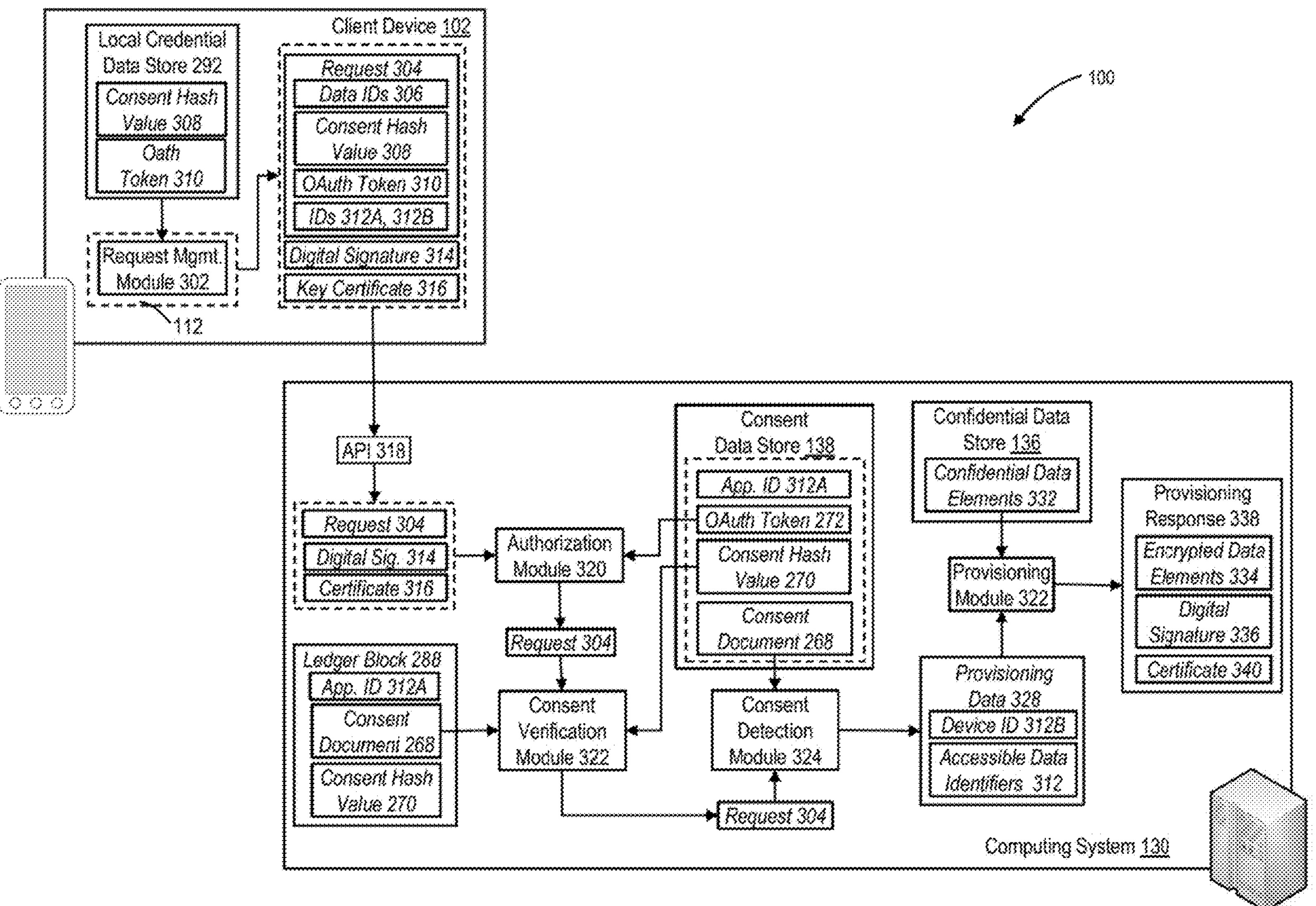
Figure 3B:
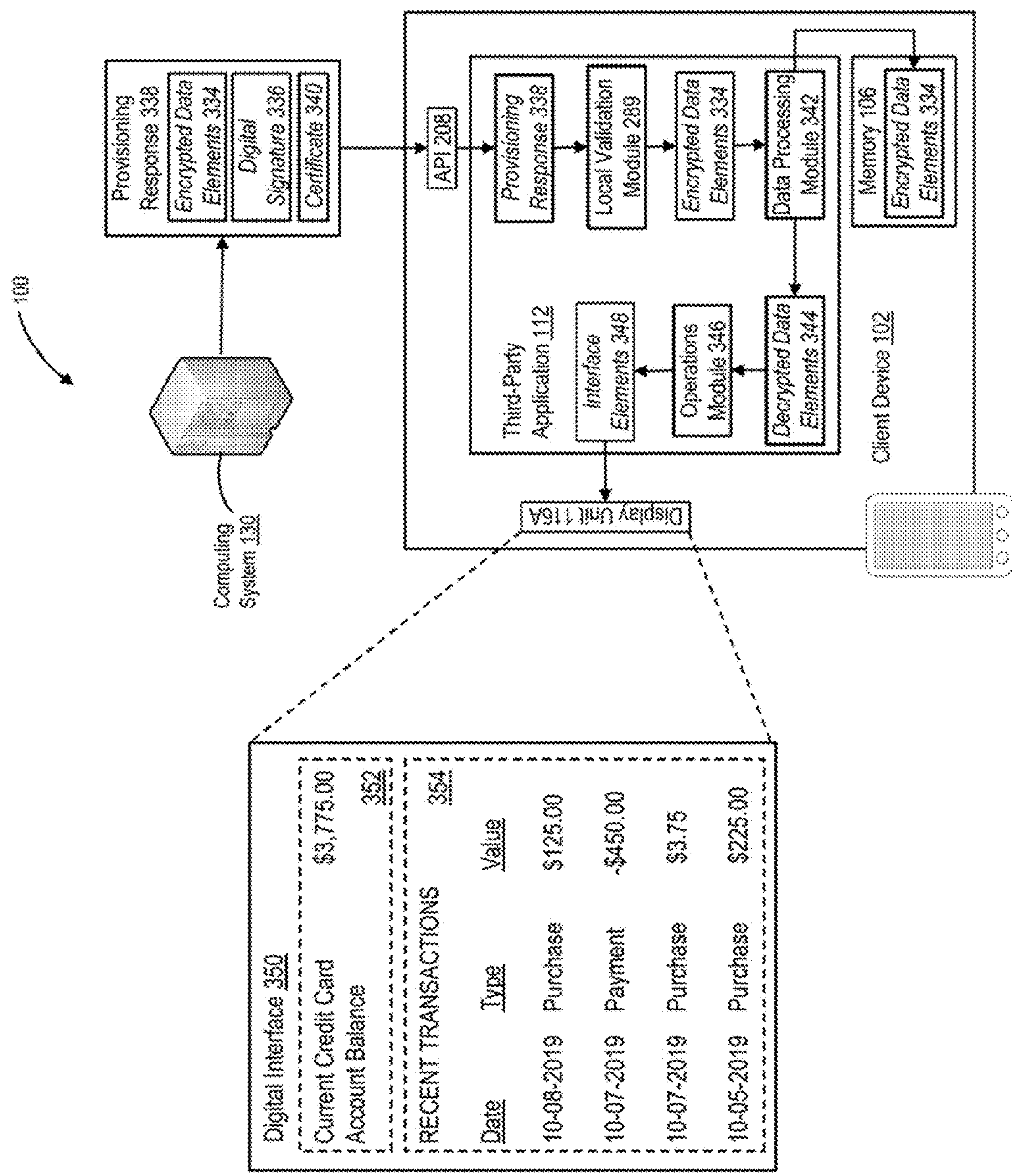

FIGS. 3A and 3B illustrate additional portions of computing environment 100, in accordance with disclosed exemplary embodiments. Referring to FIG. 3A, and upon execution by processor 104 of client device 102, one or more application modules of third-party application 112, such as request management module 302, may generate a request 304 to access one or more elements of confidential data maintained on behalf of user 101 by one or more network-connected computing systems within environment 100, such as the elements of confidential profile, account, and transaction data maintained by computing system 130. By way of example, request 304 may correspond to a request, generated by executed third-party application 112, to access a current account balance of a credit card account held by user 101 and data characterizing a specified number of recent purchase transactions involving that credit card account, e.g., the thirty most-recent purchase transactions involving the credit card account.

In some instances, request 304 may include a data identifier 306 of each of the requested elements of confidential data e.g., unique identifiers of the requested elements of account data and transaction data maintained by computing system 130. Further, although not illustrated in FIG. 3A, request 304 may also include information that identifies and characterizes one or more operations involving the requested elements of confidential data, e.g., the presentation of the account balance and the transaction data within the digital interface by executed third-party application 112.

Request 304 may also include information that identifies, characterizes, or is representative of a level of access to confidential data granted third-party application 112. By way of example, executed request management module 302 may access local credential data store 292 (e.g., as maintained within a portion of memory 106), extract a consent hash value 308, and package consent hash value 308 within a corresponding portion of request 304. In some instances, consent hash value 308 may be provisioned to executed third-party application 112 by one or more applications executed by computing system 130 (e.g., executed consent and permissioning engine 142 of FIG. 1) based on a successful outcome of any of the exemplary decoupled consent and authorization processes described herein.

In some instances, consent hash value 308 may be representative of a corresponding consent document, which includes information that identifies one or more types, classes, or discrete elements of confidential data accessible to third-party application 112, and may be generated by computing system 130 based on an application of any of the exemplary hash algorithms described herein to all or a selected portion of that corresponding consent document. Further, and as described herein, consent hash value 308 may also represent an attestation, by third-party application 112, of the level of access to confidential data currently granted third-party application 112 by user 101, e.g., using any of the exemplary decoupled consent and authorization processes described herein.

Further, although not illustrated in FIG. 3A, executed third-party application 112 may also maintain a local copy of the corresponding consent document within local credential data store 292, e.g., as provisioned to client device 102 by computing system 130 using any of the exemplary processes described herein. In some exemplary embodiments, executed request management module 302 may package all, or a selected portion, of the local copy of the corresponding consent document into request 304, e.g., either in addition to, or as an alternate to, consent hash value 308.

Further, and as illustrated in FIG. 3A, executed request management module 302 may also access and obtain an OAuth token 310 associated with third-party application 112 from local credential data store 292, and may package OAuth token 310 within a corresponding portion of request 304. OAuth token 310 may, for example, be indicative of an authentication of an identity of user 101 by computing system 130 and an authorization of third-party application 112 to access one or more programmatic interfaces established and maintained by computing system 130. As described herein, OAuth token 310 may be generated by, and provisioned to client device 102 by computing system 130 based on a successful outcome of any of the exemplary decoupled authorization and consent processes described herein.

In some instances, executed request management module 302 may also perform operations that that package, within corresponding portions of request 304, a unique identifier 312A of executed third-party application 112 (e.g., a unique cryptogram, hash value, or other element of cryptographic data, etc.) and a unique identifier 312B of client device 102 (e.g., an IP address etc.). Executed request management module 302 may further apply a digital signature 314 to all or a portion of request 304, e.g., using a private cryptographic key of third-party application 112, and may perform operations that cause computing system 130 to broadcast request 304, applied digital signature 314, and a public key certificate 316 of third-party application 112 (e.g., that includes a corresponding public cryptographic key) across network 120 to computing system 130.

A secure, programmatic interface established and maintained by computing system 130, such as application programming interface (API) 318, may receive request 304, and may route request 304, applied digital signature 314, and a public key certificate 316 to consent and permissioning engine 142, e.g., as executed by computing system 130. In some instances, and prior to routing request 304 to executed consent and permissioning engine 142, API 318 may perform operations (not illustrated in FIG. 3A) that parse request 304, extract OAuth token 310, and perform an initial pre-validation process that determines whether a format or structure of OAuth token 310 conforms with an expected token format or structure, e.g., associated with the exemplary decoupled authentication and consent protocols described herein.

If, for example, API 318 were to establish an inconsistency between the format or structure of OAuth token 310 and the expected token structure or format, API 318 may determine that OAuth token 310 is not valid for the requested access to the confidential data maintained at computing system 130. Based on the established inconsistency, API 318 may discard request 304, and computing system 130 may perform operations that generate and transmit an error message across network 120 to client device 102, e.g., via API 208 (not illustrated in FIG. 3A).

In other instances, if API 318 were to establish a consistency between the format or structure of OAuth token 310 and the expected token format or structure, API 318 may route request 304, applied digital signature 314, and a public key certificate 316 to executed consent and permissioning engine 142. For example, an authorization module 320 of executed consent and permissioning engine 142 may receive request 304, applied digital signature 314, and a public key certificate 316, and may perform operations that validate applied digital signature 314 based on a public cryptographic key of third-party application 112, e.g., as extracted from public key certificate 316. Responsive to an unsuccessful validation of digital signature 314, executed authorization module 320 determine that request 304 was corrupted or modified during transmission (e.g., through an interception by one or more malicious parties, etc.), and may discard request 304. Executed authorization module 320 may also generate and transmit an error message across network 120 to client device 102, e.g., via API 208 (not illustrated in FIG. 3A).

In other instances, and responsive to a successful validation of digital signature 314, executed authorization module 320 may parse request 304 to extract OAuth token 310 and identifier 312A of executed third-party application, and may perform operations that validate OAuth token 310, e.g., as received from executed third-party application 112. As illustrated in FIG. 3A, executed authorization module 320 may access consent data store 138 (e.g., as maintained within data repository 132), and obtain a reference version of the OAuth token, e.g., OAuth token 272, that is associated with or linked to identifier 312A within consent data store 138 and as such, is associated with third-party application 112.

Executed authorization module 320 may perform additional operations that validate OAuth token 310 based on a comparison with, and a determined consistency with, OAuth token 272. For example, if executed authorization module 320 were to detect an inconsistency between OAuth token 310 (e.g., as received from executed third-party application 112) and OAuth token 272 (e.g., as maintained within consent data store 138), executed authorization module 320 may decline to validate OAuth token 310, may reject request 304, and may perform operations that generate and transmit an error message across network 120 to client device 102, e.g., via API 208 (not illustrated in FIG. 3A).

In other instances, if authorization module 320 were to determine that OAuth token 310 corresponds to or matches OAuth token 272, executed authorization module 320 may validate OAuth token 310 and request 304. As illustrated in FIG. 3A, authorization module 320 may route validated request 304 to a consent verification module 322 of executed consent and permissioning engine 142, which may perform any of the exemplary processes described herein to determine whether executed third-party application 112 and executed consent and permissioning engine 142 each attest to a common level of access previously granted third-party application 112 by user 101.

For example, executed consent verification module 322 may parse request 304 and extract consent hash value 308 and identifier 312B of executed third-party application 112. In some instances, consent hash value 308 may correspond to, and be representative of, an attestation by third-party application 112 of the level of access previously granted third-party application 112 by user 101. Further, in some examples, executed consent verification module 322 may also access consent data store 138, and identify and extract a reference consent hash value, e.g., consent hash value 270, associated with or linked to identifier 312A (and OAuth token 272) within consent data store 138. As described herein, consent hash value 270, which may be generated by executed consent management module 266 through any of the exemplary decoupled consent and authentication protocols described herein, may correspond to, and be representative of, an attestation by executed consent and permissioning engine 142 (and as such, of computing system 130), of the level of access previously granted third-party application 112 by user 101.

In additional, or alternate, examples, executed consent management module 266 perform operations that obtain consent hash value 270 from within one or more elements of a distributed ledger maintained locally by, or available to, computing system 130. For instance, computing system 130 may maintain, within data repository 132, a local copy of distributed ledger, such as updated distributed ledger 282, which establishes an immutable and cryptographically secure record of a temporal evolution in the level of access granted executed third-party application 112 by user 101. In some examples, executed consent management module 266 may access one or more consent ledger blocks of updated distributed ledger 282, such as ledger block 288, that include or reference identifier 312A of executed third-party application 112. Executed consent management module 266 may perform operations that establish an association between identifier 312A and consent hash value 270 within accessed ledger block 288, and that extract consent hash value 270 from accessed ledger block 288.

Executed consent verification module 322 may perform additional operations that determine whether consent hash value 308 (e.g., as received from executed third-party application 112) corresponds to, and matches, consent hash value 270 (e.g., as generated by executed consent management module 266 of computing system 130). If, for example, consent verification module 322 were to determine an inconsistency between consent hash values 270 and 308, executed consent verification module 322 may determine that third-party application 112 attests to a level of access to confidential data that differs from, and is inconsistent with, the level of access to which computing system 130 attests (e.g., through consent hash value 270).

Based on the determined inconsistency, consent verification module 322 may reject request 304, and may perform operations that generate and transmit an error message across network 120 to client device 102, e.g., via API 208 (not illustrated in FIG. 3A). In further instances, and based on the determined inconsistency, consent verification module 322 may also perform operations that provision, to executed third-party application 112, additional information that confirms the level of access to confidential data currently granted to executed third-party application 112 by user 101, such as, but not limited to, consent hash value 270 or portions of consent document 268. By way of example, consent verification module 322 may package consent hash value 270 and/or the portions of consent document 268 within the generated error message, e.g., for transmission across network 120.

In some instances, not illustrated in FIG. 3A, client device 102 may receive the generated error message, e.g., via API 208, and executed third-party application 112 parse the error message to extract consent hash value 270 (and additionally, or alternatively, the portions of consent document 268), which may be stored in conjunction with OAuth token 310 within memory 106, e.g., as a replacement for consent hash value 308 (and additionally, or alternatively, for the previously stored portions of consent document 268). Certain of these exemplary processes, which facilitate a dynamic re-provisioning of the consent hash value (or other information characterizing the level of access currently granted to executed third-party application 112) to client device 102 without invalidating a previously provisioned OAuth token, may be implemented by computing system 130 and by client device 102 in addition to, or as an alternate to, certain token-based authorization and consent process that, when implemented in response to the determined inconsistency, invalidate any existing OAuth token, and require an additional authentication of user 101 and a generation of an additional OAuth token.

The disclosed exemplary embodiments are, however, not limited to processes that maintain a validity of a previously generated OAuth token in response to a detected inconsistency between consent hash values 308 and 270 and as such, between the attestations of the level of access previously granted to executed third-party application. By way of example, consent verification module 322 may establish that the inconsistency between consent hash values 270 and 308, as determined using any of the exemplary processes, represents a latest one in a sequence or pattern of such determined inconsistencies, e.g., between consent hash values submitted by executed third-party application 112 and corresponding consent hash values locally maintained at computing system 130. Responsive to the determined sequence or pattern of inconsistencies, consent verification module 322 may perform operations that invalidate OAuth token 272, e.g., through a storage of revocation data (e.g., an invalidation flag) in conjunction with OAuth token 272 within consent data store 138 and additionally or alternatively, through a recordation of the revocation data within an additional one of consent ledger blocks 188 of distributed ledger 186.

Referring back to FIG. 3A, if executed consent verification module 322 were to determine that consent hash value 308 corresponds to, and matches, consent hash value 270, executed consent verification module 322 may determine that third-party application 112 and computing system 130 attest to a common level of access granted to executed third-party application 112 by user 101. Based on the attestation to the common level of granted access, executed consent verification module 322 may perform operations that route request 304 to a consent detection module 324 of executed consent and permissioning engine 142, which may perform any of the exemplary processes described herein to determine whether the one or more elements of confidential data requested by executed third-party application are consistent with the type or level of access previously granted to executed third-party application by user 101.

For example, executed consent detection module 324 may parse request 304 to extract data identifiers 306, which uniquely identify each of the elements of confidential data requested by third-party application 112, and may perform operations that access consent data store 138 and extract all, or a selected portion, of consent document 268 associated with third-party application 112. In other examples, consent detection module 324, may obtain all or a portion of consent document 268 from ledger block 288, e.g., in association with application identifier 312A. As described herein, consent document 268 may identify one or more types, classes, or discrete elements of data (e.g., as maintained by computing system 130) that are accessible to executed third-party application 112, and as illustrated in FIG. 3A, consent document 268 and consent hash value 270 (e.g., that represents consent document 268) may each be associated with identifier 312A of executed third-party application 112 within consent data store 138.

In some examples, and based on a comparison between consent document 268 and data identifiers 306, executed consent detection module 324 may determine whether each of the requested elements of confidential data (e.g., as specified by identifiers 306) is consistent with the level of access previously granted to third-party application 112 by user 101 (e.g., as specified within consent document 268). If, for example, executed consent detection module 324 were to detect an inconsistency between the previously granted level of access (e.g., as specified within consent document 268) and the requested elements of confidential data, executed consent detection module 324 may determine that the request 304 is inconsistent with the previously granted level of access. In some instances (not illustrated in FIG. 3A), executed consent detection module 324 may discard request 304, and may perform operations that generate and transmit an error message to executed third-party application 112, e.g., via API 208.

Alternatively, if executed consent detection module 324 were to establish a consistency between the previously granted level of access and each of the requested elements of confidential data, executed consent detection module 324 may perform operations that package each of data identifiers 306 into corresponding portions of accessible data identifiers 326. By way of example, and as described herein, data identifiers 306 may identify requested elements of confidential data that include, but are not limited to, a current account balance of a credit card account held by user 101 and transaction dates and values characterizing a specified number of recent purchase transactions involving that credit card account, e.g., the thirty most-recent purchase transactions involving the credit card account.

Additionally, and as described herein, information within consent document 268 may indicate that user 101 denied third-party application 112 access to elements of confidential customer profile data maintained at computing system 130, granted third-party application 112 access to any elements of confidential account data maintained on behalf of user 101 by computing system 130, and Further, the information within consent document 268 may also indicate that user 101 granted third-party application 112 access to elements of confidential transaction data characterizing a transaction type, value, and time for one or more transactions involving user 101, while denying access to any elements of confidential transaction data characterizing a payment instrument, a product or service, or a counterparty involved in the one or more transactions.

In some examples, executed consent detection module 324 may establish that the requested elements of confidential account and transaction data (e.g., as specified by data identifiers 306) are each consistent with the accessible types, classes, or discrete elements of confidential data identified by consent document 268. Executed consent detection module 324 may generate accessible data identifiers 326 that include each of data identifiers 306, e.g., that identify the current account balance of the credit card account and the transaction dates and values characterizing the thirty most-recent purchase transactions involving the credit card account. Further, executed consent detection module 324 may also generate provisioning data 328 that includes accessible data identifiers 312 and the unique identifier 312B of client device 102 (e.g., an IP address, a MAC address, etc.), and may provide provisioning data 328 as an input to a provisioning module 330 executed by computing system 130.

In other instances, executed consent detection module 324 may establish that the requested elements of confidential data associated are partially inconsistent with the previously granted type or level of access (e.g., as specified within consent document 268). For example, executed consent detection module 324 may determine that a first subset of the requested elements of the confidential data, as specified by data identifiers 306, is consistent with the accessible types, classes, or discrete elements of confidential data identified by consent document 268, which determining that a second subset of the requested elements of confidential data is inconsistent with the accessible types, classes, or discrete elements of confidential data identified by consent document 268. Executed consent detection module 324 may, in some instances, perform operations that extract a portion of data identifiers 306 that correspond to the accessible first subset, and generate accessible data identifiers 326 that include the extracted portion of data identifiers 306. Executed consent detection module 324 may further package accessible data identifiers 326 and device identifier 312B into provisioning data 328, which executed consent detection module 324 may provide as an input to a provisioning module 330 of computing system 130.

As illustrated in FIG. 3A, and upon execution by computing system 130, provisioning module 330 may receive provisioning data 328, which includes accessible data identifiers 326 and device identifier 312B. Executed provisioning module 330 may access confidential data store 136, and identify and perform operations that identify extract elements of confidential data 332 that correspond to accessible data identifiers 326. For example, confidential data elements 332 may include, among other things, the current account balance of the credit card account held by user 101 (e.g., a balance of $3,775.00), and the elements of transaction data that specify the transaction dates and values of the thirty, most-recent purchase transactions involving the credit card account. Further, executed provisioning module 330 may encrypt confidential data elements 332 using, for example, a public cryptographic key associated with or assigned to third-party application 112, and may output elements of encrypted confidential data 334. Further, executed provisioning module 330 may also apply a digital signature 336 to the elements of encrypted confidential data 334, e.g., using any appropriate digital signature algorithm in conjunction with a private cryptographic key of computing system 130.

Executed provisioning module 330 may package the elements of encrypted confidential data 334 into corresponding portions of a response to request 304, e.g., provisioning response 338, along with digital signature 336 and a public key certificate 340 of computing system 130 (e.g., that includes a corresponding public cryptographic key). In some instances, executed provisioning module 330 may perform operations that cause computing system 130 to transmit provisioning response 338 across network 120 to client device 102 using any appropriate communications protocol, e.g., via the corresponding communications interface, such as the transceiver device.

Referring to FIG. 3B, API 208 of executed third-party application 112 may receive provisioning response 338, and may route provisioning response 338 to local validation module 289 of executed third-party application 112. In some instances, executed local validation module 289 may parse provisioning response 338 to extract digital signature 336 and public key certificate 340, and may perform operations that validate digital signature 336 based on the public cryptographic key of computing system 130 included within public key certificate 340. If, for example, local validation module 289 were unable to validate digital signature 336, local validation module 289 may determine that at least a portion of provisioning response 338 was corrupted or otherwise modified during transmission (e.g., through an interception by one or more malicious parties, etc.), and executed third-party application 112 may discard provisioning response 338 and await additional provisioning response generated and transmitted by computing system 130 (not illustrated in FIG. 3B).

In other examples, and based on a successful validation of digital signature 336, local validation module 289 may provide the elements of encrypted confidential data 334 as an input to a data processing module 342 of executed third-party application 112. Executed data processing module 342 may, for instance, perform operations that store the elements of encrypted confidential data 334 within a corresponding portion of memory 106. Executed data processing module 342 may also access a private cryptographic key of third-party application 112, and may decrypt the elements of encrypted confidential data 334, e.g., to generate decrypted elements of confidential data 344. Executed data processing module 342 may route the decrypted elements of confidential data 344 to an operations module 346 of executed third-party application 112, which may perform one or more operations on the decrypted elements of confidential data 344.

The one or more operations may include, among other things, processes that aggregate, transform, or modify certain of the decrypted elements of confidential data 344, or that present all or a portion of the decrypted elements of confidential data 344 within a corresponding digital interface. As illustrated in FIG. 3B, executed operations module 346 may perform operations that generate one or more interface elements 348 that provide a graphical or textual representation of corresponding ones of the decrypted elements of confidential data 344. Operations module 346 may route each of generated interface elements 348 to display unit 116A of client device 102, which may render generated interface elements 348 for presentation within digital interface 350. For example, digital interface 350 may include interface element 352, which when rendered for presentation, identifies a current account balance of $3,775.00 for the credit card account held by user 101. Further, digital interface 350 may also include additional interface elements 354, which when rendered for presentation, identify the transaction dates and transaction values of at least a portion of the thirty, most-recent transactions involving the credit card account of user 101.

In some instances, one or more application programs, engines, or modules executed by client device 102 and computing system 130 (and in some instances, peer systems 180) may perform one or more of the exemplary, decoupled consent and authorization processes described herein, which enable a user of client device 102, such as user 101, to provide permission for one or more third-party applications, e.g., third-party application 112, to access elements of confidential maintained on behalf of user 101 at a custodian system operating within environment 100, such as computing system 130. By way of example, and based on authentication credentials (e.g., provided by user 101 in response to the exemplary digital authentication interfaces described herein) and consent data (e.g., provided by user 101 in response to the exemplary digital consent interfaces described herein) received from client device 102, computing system 130 may perform any of the exemplary decoupled consent and authorization processes described herein to generate a digital token, e.g., an OAuth token, indicative of a successful authentication of an identity of user 101, and one or more elements of information, such as the consent document and consent hash value described herein, indicative of a level of access granted by user 101 to executed third-party application.

As described herein, computing system 130 may perform operations that store the generated OAuth token in conjunction with the consent hash value and the consent document, and provision the OAuth token, the consent hash value, and in some instances, all or a portion of the consent document to executed third-party application 112. Certain of these exemplary processes, which decouple the generation and provisioning of the OAuth token from the generation and provisioning of the consent hash value and corresponding consent document, may be implemented in addition to, or as an alternate to, one or more existing token-based consent and authorization processes, such as the OAuth protocols described herein, which generate a single digital token (e.g., an OAuth token) representative and indicative of both the authorization of user 101 and the consent granted by user 101 to executed third-party application.

In other instances, certain of the exemplary decoupled consent and authorization processes described herein, when implemented by the one or more application programs, engines, or modules executed by client device 102, computing system 130, and/or peer systems 180, may enable user 101 to selectively modify a level of access to confidential data previously granted to a third-party application, while maintaining a validity and a pendency of the OAuth token previously generated and provisioned to that third-party application. By way of example, and referring to as described below, user 101 may provide input to client device 102 that triggers an execution of an application program, such as, but not limited to, mobile banking application 110 provisioned to client device 102 by computing system 130, or a web browser application capable of accessing computing system 130, e.g., via a corresponding web server.

When executed by client device 102, mobile banking application 110 and/or the web browser application may obtain information from computing system 130 that identifies and characterizes a level of access granted to user 101 to one or more third-party applications executable at client device 102, such as, but not limited to, third-party applications 112 and 114. As described herein, executed mobile banking application 110 and/or the executed web browser application may perform operations that render the obtained information within one or more display screens of a corresponding digital interface, which may prompt user 101 to provide input that modifies or revokes a level of access granted to third-party application 112, third-party application 114, and additionally, or alternatively, to the one or more additional third-party applications executable at client device 102. Based on data identifying the modified or revoked access for a particular one of the third-party applications, such as executed third-party application 112 or third-party application 114, computing system 130 may perform any of the exemplary processes described herein to generate a modified consent document and corresponding consent hash value for that particular third-party application, and to provision the corresponding hash value to the particular third-party application (e.g., alone or in conjunction with the modified consent document), without invalidating a pending and previously generated OAuth token for that particular third-party application, as described in reference to FIGS. 4A-4E.

Figure 4A:
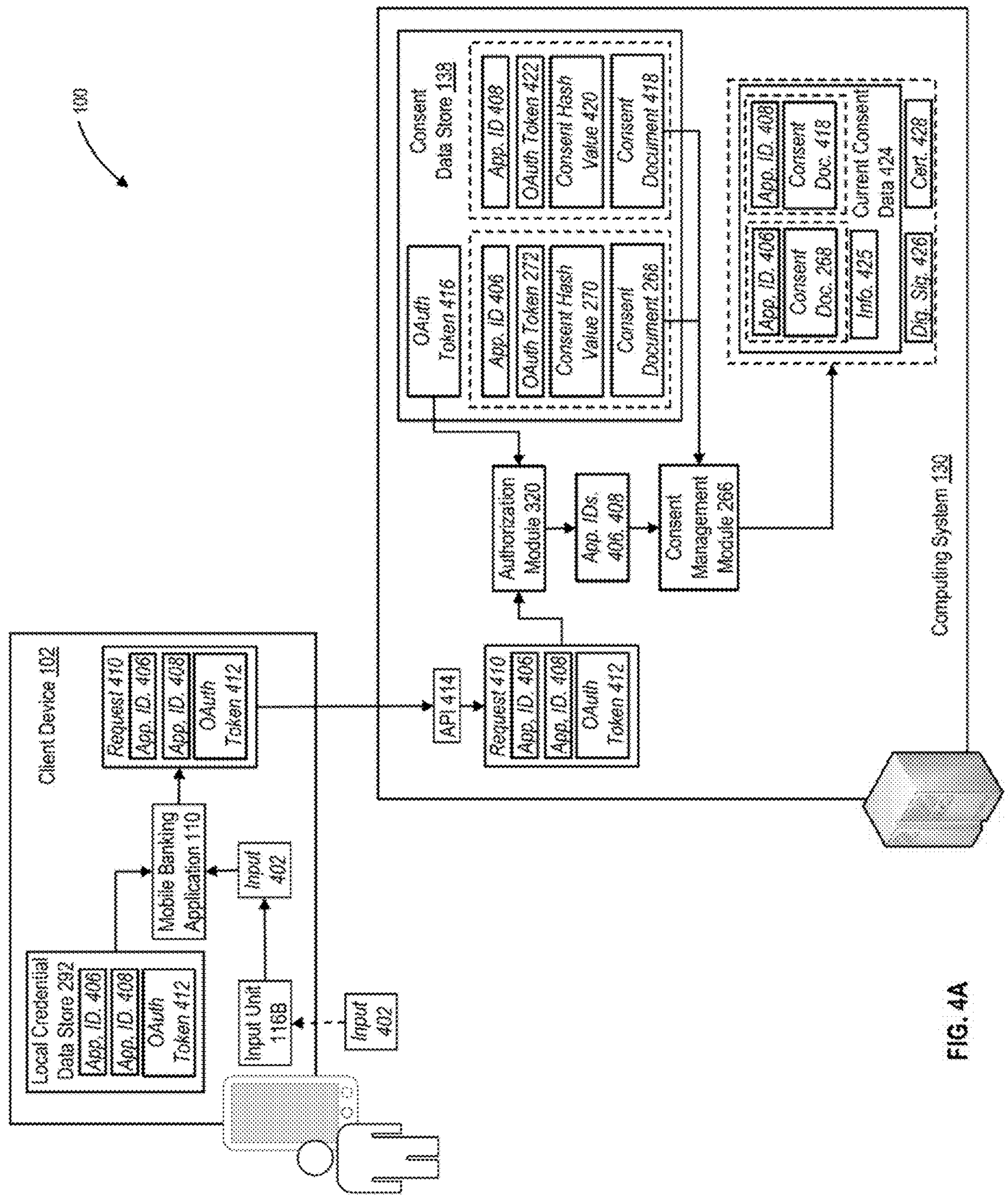

Referring to FIG. 4A, user 101 may provide input 402 to client device 102 (e.g., via input unit 116B) that requests an execution of an application program associated with and provisioned by computing system 130, such as mobile banking application 110 or a web browsing application. For example, and upon execution by client device 102, mobile banking application 110 may generate one or more interface elements that, when rendered for presentation by display unit 116A, collectively establish one or more display screens of a digital authentication interface (not illustrated in FIG. 4A). The digital authentication interface may prompt user 101 to provide, via input unit 116B, one or more authentication credentials that uniquely identify user 101 at computing system 130, such as, but not limited to, an alphanumeric login credential, an alphanumeric password, or one or more biometric credentials (e.g., a digital image of a face of user 101 or a digital scan of a thumbprint or fingerprint of user 101).

Executed mobile banking application 110 may receive the one or more authentication credentials, e.g., via input unit 116B, and may perform operations that authenticate an identity of user 101. For example, executed mobile banking application 110 may authenticate the identity of user 101 based on a comparison between the received authentication credentials and corresponding locally maintained authentication credentials, or based on interaction with computing system 130, as described herein. In other examples (not illustrated in FIG. 4A), as computing system 130 provisioned mobile banking application 110 to client device 102, executed mobile banking application 110 may perform operations that, in conjunction with one or more application programs, engines, or modules executed by computing system 130, implements a token-based consent and authorization processes (e.g., an OAuth protocol) to authenticate an identity of user 101 and generate an OAuth token indicative of the successful authentication of the identity of user 101 and a permission of executed mobile banking application 110 to access programmatic interfaces established and maintained by computing system 130. Computing system 130 may, for instance, provision the OAuth token to executed mobile banking application 110 for storage within memory 106.

Responsive to a successful authentication of the identity of user 101, executed mobile banking application 110 may perform operations that identify each of the third-party applications executed by client device 102, and that generate data requesting, from computing system 130, a level of access to confidential data currently granted to each of the identified third-party applications by user 101. By way of example, application repository 108 may maintain third-party applications 112 and 114, which may include, but are not limited to, a financial management application that tracks balances of, and transactions involving, one or more accounts held by user 101 based on confidential data maintained at computing system 130 and other computing systems operating within environment 100. In some instances, not illustrated in FIG. 4A, memory 106 of client device 102 may maintain, for each of third-party applications 112 and 114, a unique application identifier in conjunction with a corresponding OAuth token and corresponding elements of elements of information, such as a consent hash value (or a corresponding consent document) indicative of the level of access granted to each of third-party applications 112 and 114 to access elements of confidential data maintained at computing system 130.

Referring back to FIG. 4A, executed mobile banking application 110 may access a portion of memory 106, such as local credential data store 292, and may perform operations that extract unique application identifier 406 of third-party application 112 and unique application identifier 408 of third-party application 114. Examples of application identifiers 406 and 408 may include, but are not limited to, a unique cryptogram, hash value, or other element of cryptographic data that uniquely identify third-party applications 112 and 114 to one or more computing systems that operate within environment 100 and maintain confidential data on behalf of user 101, such as computing system 130. In some instances, executed mobile banking application 110 may perform operations that package applications identifiers 406 and 408 into corresponding portions of a request 410 for information that identifies the level of access to confidential data currently granted each of the third-party applications 112 and 114 by user 101, e.g., through any of the exemplary decoupled consent and authorization processes described herein.

Executed mobile banking application 110 may also perform operations that package, into a portion of request 410, additional data that identifies executed mobile banking application 110 and further, indicates a successful confirmation of the identity of user 101, e.g., based on the received authentication credentials using any of the exemplary processes described herein. For example, executed mobile banking application 110 may access local credential data store 292, and obtain an OAuth token 412 associated with executed mobile banking application 110, and further, package OAuth token 412 into a corresponding portion of request 410. As described herein, OAuth token 412 may be indicative not only a successful authentication of the identity of user 101, but also a permission of executed mobile banking application 110 to access the one or more programmatic interfaces established and maintained by computing system 130.

Referring back to FIG. 4A, executed mobile banking application 110 may perform additional operations that cause client device 102 to transmit request 410 across network 120 to computing system 130. A programmatic interface established by and maintained at computing system 130, such as application programming interface (API) 414, may receive request 410, and may route request 410 to consent and permissioning engine 142, e.g., as executed by computing system 130. In some instances, and prior to routing request 410 to executed consent and permissioning engine 142, API 414 may perform a pre-validation process (not illustrated in FIG. 4A) that determines whether a format or structure of OAuth token 412 of executed mobile banking application 110 conforms with an expected token format or structure.

Based on an established consistency between the format or structure of OAuth token 412 and the expected structure or format, API 414 may route request 410 to authorization module 320 of executed consent and permissioning engine 142. In some instances, executed authorization module 320 may perform any of the exemplary processes described herein to validate OAuth token 412 based on a comparison with, and a determined consistency with, a reference OAuth token locally maintained within consent data store 138 on behalf of executed mobile banking application 110, e.g., OAuth token 416 maintained within consent data store 138.

For example, if executed authorization module 320 were to detect an inconsistency between OAuth token 412 (e.g., as received from executed mobile banking application 110)) and OAuth token 416 (e.g., as maintained on behalf of executed mobile banking application 110 within consent data store 138), executed authorization module 320 may decline to validate OAuth token 412 and may reject request 410. Executed authorization module 320 may perform any of the exemplary processes described herein that generate and transmit an error message across network 120 to client device 102, e.g., via a programmatic interface (not illustrated in FIG. 3A).

In other instances, if executed authorization module 320 were to determine that OAuth token 412 corresponds to or matches OAuth token 416, executed authorization module 320 may validate OAuth token 412 and request 410. Responsive to the successful validation, executed authorization module 320 may extract application identifiers 406 and 408 from now-validated request 410, and may provide application identifiers 406 and 408 as an input to a management module of executed consent and permissioning engine 142, e.g., consent management module 266, which may perform any of the exemplary processes described herein to establish a level of access to confidential data previously granted by user 101 to each of third-party applications identified within request 410, e.g., third-party applications 112 and 114, and to provision information identifying and characterizing the previously granted level of access to executed mobile banking application 110.

For example, executed consent management module 266 may receive application identifiers 406 and 408, which uniquely identify respective ones of third-party applications 112 and 114. In some instances, executed consent management module 266 may perform operations that access consent data store 138, and identify and obtain a current consent document associated with, and linked to, each of application identifiers 406 and 408 within consent data store 138. For example, as illustrated in FIG. 4A, consent data store 138 may maintain, on behalf of third-party application 112, consent document 268, consent hash value 270, and OAuth token 272, each of which may be associated with application identifier 406. Further, consent data store 138 may also maintain a consent document 418, a corresponding consent hash value 420, and an OAuth token 422 on behalf of third-party application 114, and may associate each of consent document 418, consent hash value 420, and OAuth token 422 within application identifier 408 of third-party application 114.

As described herein, each of consent documents 268 and 418 may include data that identifies and characterizes a level of access currently granted, or denied, to respective ones of third-party applications 112 and 114 by user 101. By way of example, consent documents 268 and 418 may, for respective ones of third-party applications 112 and 114, identify a selective grant of access to specific types or classes of confidential data maintained within confidential data store 136, such as, but not limited to, customer data, account data, or transaction data maintained on behalf of user 101 by computing system 130. Additionally, or alternatively, and for respective ones of third-party applications 112 and 114, consent documents 268 and 418 may also identify a selective grant of access to particular data elements within the specific types or classes of confidential customer data, account data, or transaction data.

Further, and as described herein, consent documents 268 and 418 may identify, for respective ones of third-party applications 112 and 114, a permission granted by user 101 to perform one or more operations on the accessed elements of confidential data, such as, but not limited to: presenting the accessed elements of confidential data within one or more digital interfaces; storing the accessed elements of confidential data within one or more locally or remotely accessible data repositories; further processing or aggregating the accessed elements of confidential data; or distributing the accessed elements of confidential data to additional related or unrelated computing systems or to application programs executed by these additional or unrelated systems (e.g., fourth- and fifth-party applications, etc.). Each of consent documents 268 and 418 may be formatted in accordance with one or more data-interchange formats, such as, but are not limited to, a JavaScript Object Notation (JSON) format, a YAML format, an Internet-JSON (I-JSON) format, an XML format, or any additional or alternate language-independent, data serialization formats.

In some instances, each of consent documents 268 and 418, consent hash values 270 and 420, and OAuth tokens 272 and 422 may be generated through a collective implementation of any of the exemplary, decoupled consent and authentication processes described herein by computing system 130 (e.g., through executed consent and permissioning engine 142) and client device 102 (e.g., via an execution of respective ones of third-party applications 112 and 114). For example, consent hash values 270 and 420 may be representative of consent documents 268 and 418, respectively, and may be generated through an application of any of the exemplary cryptographic or non-cryptographic hash functions to respective ones of consent documents 268 and 418. Further, and as described herein, OAuth tokens 272 and 422 may be indicative of a successful authentication of the identity of user 101 and of an authorization for respective ones of third-party application 112 and 142 to access the programmatic interfaces established or maintained by computing system 130.

Referring back to FIG. 4A, executed consent management module 266 may access consent data store 138, and may perform operations that extract consent document 268 associated with third-party application 112, e.g., as associated with application identifier 406 within consent data store 138. For example, and as described herein, consent document 268 may indicate that: (i) user 101 denied third-party application 112 access to elements of confidential customer profile data maintained at computing system 130; (ii) user 101 granted third-party application 112 access to any elements of confidential account data maintained on behalf of user 101 by computing system 130; and (iii) user 101 granted third-party application 112 access to elements of confidential transaction data characterizing a transaction type, value, and time for one or more transactions involving user 101. In some instances, executed consent management module 266 may package application identifier 406 and all or a selected portion of consent document 268 within a corresponding portion of current consent data 424.

Executed consent management module 266 may also perform operations that extract, from consent data store 138, consent document 418 associated with third-party application 114 (e.g., which may be associated with application identifier 408 within consent data store 138). For example, and as described herein, consent document 418 may indicate that: (i) user 101 also denied third-party application 114 access to elements of confidential customer profile data maintained at computing system 130; (ii) user 101 granted third-party application 114 access to elements of confidential account data that identify balances of one or more financial services accounts (e.g., deposit accounts, credit card accounts, etc.) issued to user 101 by the financial system associated with computing system 130; and (iii) user 101 granted third-party application 114 access to elements of confidential transaction data characterizing a transaction type, value, and time for transactions involving the one or more financial services accounts. In some instances, executed consent management module 266 may package application identifier 408 and all or a selected portion of consent document 418 within a corresponding portion of current consent data 424.

Although not illustrated in FIG. 4A, executed consent management module 266 may also extract, from consent data store 138, consent hash values 270 and 420 associated with respective ones of third-party applications 112 and 114 (e.g., which are representative of respective ones of consent documents 268 and 418), and may package consent hash values 270 and 420 into corresponding portions of current consent data 424. In some instances, by incorporating consent hash values 270 and 420 into current consent data 424, certain of the exemplary embodiments may enable client device 102 to verify an integrity of each of consent documents 268 and 418 through a calculation of respective local hash values and a comparison of the local hash values against corresponding ones of consent hash values 270 and 420.

Further, and in additional to consent documents (and representative hash values) that identify a level of access granted by user 101 to third-party applications 112 and 114, current consent data 424 may also include additional information identifying certain types, classes, or elements of confidential data that are maintained on behalf by user 101 by computing system 130 and as such, that are potentially accessible to third-party applications 112 and 114, when executed at client device 102. For example, executed consent management module 266 may also perform operations that package, into current consent data 424, additional information 425, that identifies certain of the available types or classes of confidential data (e.g., confidential profile, account, or transaction data, etc.), along with certain data elements associated with each of the types or classes (e.g., elements of profile data that include governmental identifiers, elements of transaction data that include transaction times, transaction values, and identifiers of corresponding merchants or purchased products, elements of account data that include account identifiers, account balances, etc.).

Executed consent management module 266 may also apply a digital signature 426 to all or a portion of current consent data 424, e.g., using a private cryptographic key of executed mobile banking application 110. Executed consent management module 266 may perform operations that cause computing system 130 to broadcast current consent data 424, applied digital signature 426, and a public key certificate 428 of executed mobile banking application 110 (e.g., that includes a corresponding public cryptographic key) across network 120 to client device 102.

Figure 4B:
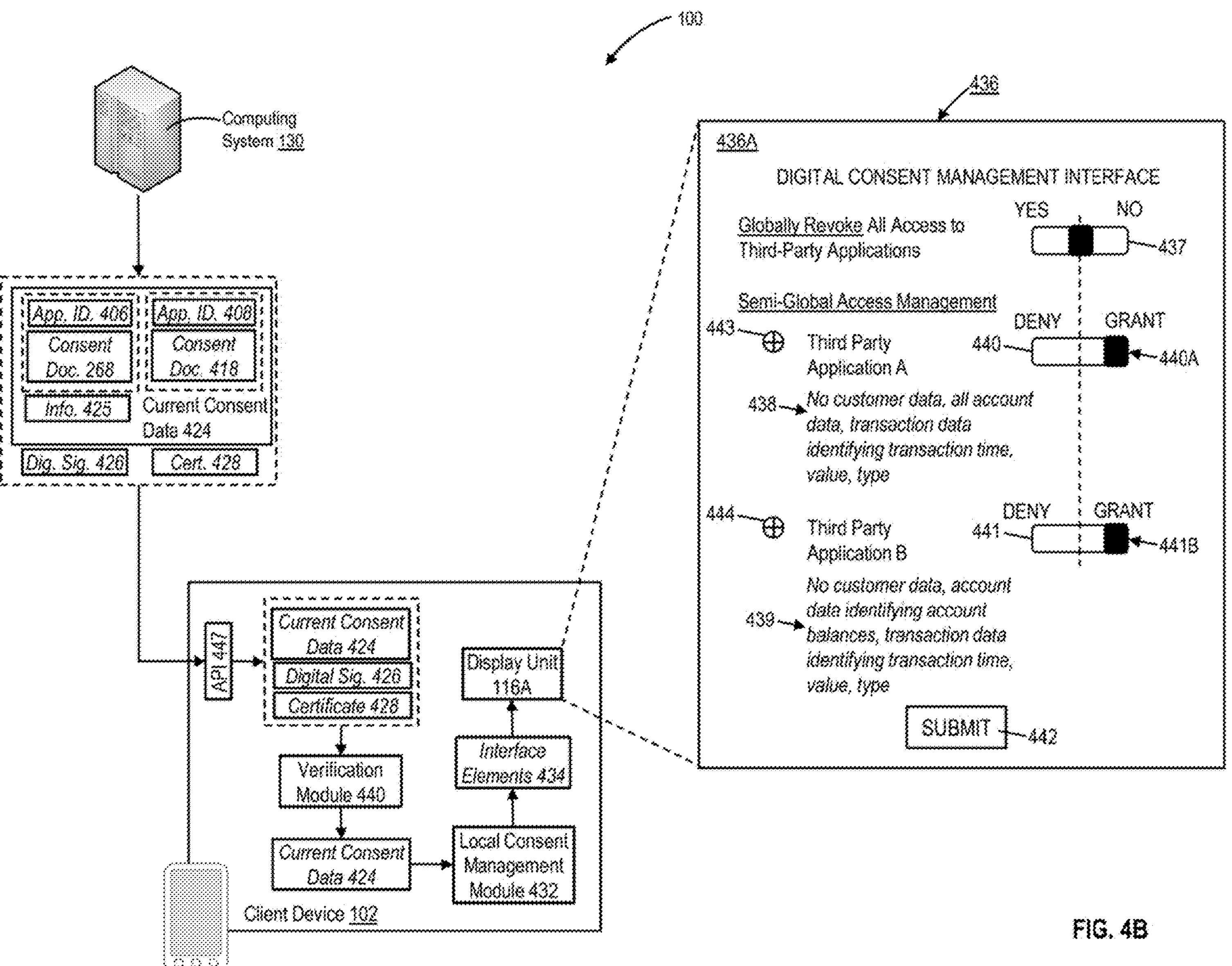

Referring to FIG. 4B, a secure programmatic interface established and maintained by executed mobile banking application 110, such application programming interface (API) 428, may receive current consent data 424 (and applied digital signature 426 and public key certificate 428) from computing system 130, and may route current consent data 424, applied digital signature 426, and public key certificate 428 to executed mobile banking application 110. In some instances, a verification module 430 of executed mobile banking application 110 may perform operations that verify an integrity of current consent data 424 in response to a successful validation of applied digital signature 426, e.g., based on the public cryptographic key extracted from public key certificate 428. In other instances, as described herein, current consent data 424 may also include consent hash values 270 and 420 (e.g., representative of respective ones of consent documents 268 and 418), and executed verification module 430 may perform additional operations that verify an integrity of each of consent documents 268 and 418 by computing corresponding local hash values (e.g., through an appropriate one of the exemplary hash functions described herein to consent documents 268 and 418) and by comparing the local hash values against respective ones of consent hash values 270 and 420.

Based on the verified integrity of current consent data 424 (and additionally, or alternatively, the verified integrity of consent documents 268 and 418), executed verification module 430 may provide current consent data 424 as an input to a local consent management module 432 of executed mobile banking application 110. In some instances, executed local consent management module 432 may process current consent data 424 and generate interface elements 434 that, when rendered for presentation by display unit 116A, collectively establish one or more display screens of a digital consent management interface 436. In some instances, display screen 436A of digital consent management interface 436 may prompt user 101 to provide additional input to client device 102 that modifies a level of access previously granted to third-party application 112, third-party application 114, and/or other third-party applications executed by client device 102 on a global basis (e.g., a revocation of the previously granted access to all third-party applications) or alternatively, on a semi-global basis (e.g., a revocation of the previously granted access to a selected subset of the third-party applications, such as one or more of third-party application 112 or third-party application 114).

For example, and as illustrated in FIG. 4B, display screen 436A may include an interactive interface element, such as slider element 437, that enables user 101 to revoke, e.g., on a global basis, all access to confidential data previously to any third-party application executed at client device 102, such as, but not limited to, executed third-party applications 112 and 114. In other instances, display screen 436A may include additional interface elements that identify and summarize a level of access previously granted to each of the third-party applications executed at client device 102, such as interface elements 438, which identify and summarize the level of access previously granted to third-party application 112 (e.g., "Third-Party Application A"), and interface elements 439, which identify and summarize the level of access previously granted to third-party application 113 (e.g., "Third-Party Application B").

Display screen 436A may also include one or more interactive interface elements, such as slider elements 440 and 441, that enable user 101 to revoke, on a semi-global basis, the level of access previously granted to respective ones of third-party application 112 (e.g., slider element 440) and third-party application 114 (e.g., slider element 441). In some instances, display screen 436A may include additional interface elements, such as "SUBMIT" element 442, that, when selected by user 101 through additional provided input, confirm an election by user 101 to revoke, or maintain, the level of access granted to third-party application 112, third-party application 114, or other third-party applications, either on a global or semi-global basis.

In other examples, one or more display screens of digital consent management interface 436 may facilitate a selective modification of the level of access to specific classes, types, or discrete elements of confidential data previously granted by user 101 to third-party application 112, third-party application 114, or other third-party applications executed by client device 102 by user 101. For instance, as illustrated in FIG. 4B, display screen 436A may include additional interactive elements, such as interactive elements 443 and 444 that, when selected by user 101 via input provided to client device 102 (e.g., via input unit 116B), cause executed local consent management module 432 to further process current consent data 424 and generate additional ones of interface elements 434 that identify one or more types, classes, or discrete elements of confidential data available to the third-party applications (e.g., based on information 425 within current consent data 424) and further, that identify the level of access to these types, classes, or discrete elements of confidential data granted previously to each of the third-party applications (e.g., based on consent documents 268 and 418 within current consent data 424). When rendered for presentation within an additional display screen of digital consent management interface 436, the additional ones of interface elements 434 may enable user 101 to review or modify the classes, types, or discrete elements of confidential data currently accessible to selected ones of the third-party applications, including third-party applications 112 and 114.

For example, user 101 may provide further input to client device 102 that selects interactive element 444 within display screen 436A, which indicates an intention by user 101 to review and in some instances, selectively modify, the access previously granted by user 101 to third-party application 114. Responsive to the further input, executed local consent management module 432 may further process current consent data 424 and generate the additional ones of interface elements 434, which may rendered by display unit 116A within an additional display screen 436B of digital consent management interface 436, described below in reference to FIG. 4C.

Figure 4C:
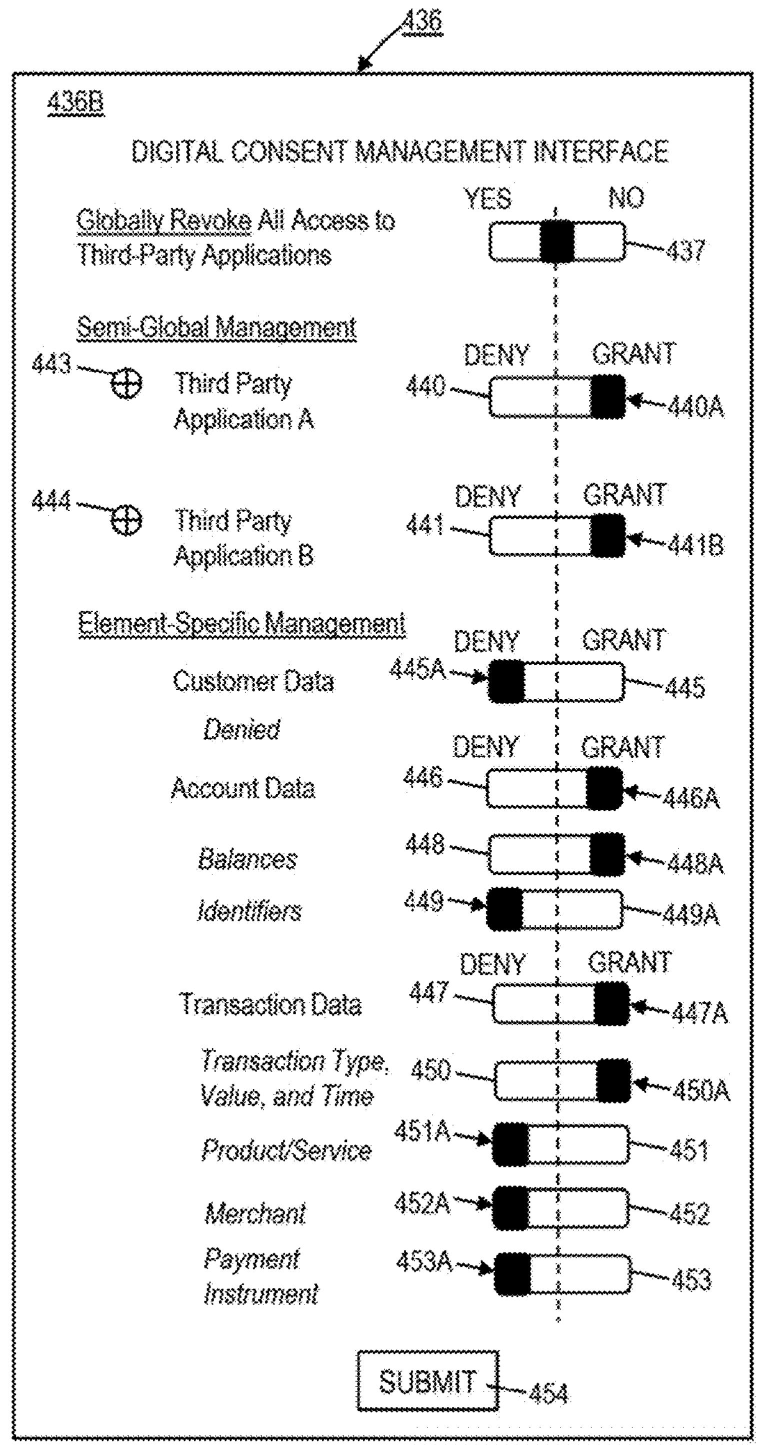
FIGS. 4C-4D are diagrams of exemplary digital interfaces, in accordance with some embodiments.

Referring to FIG. 4C, display screen 436B may include interactive interface elements associated with each of the available types or classes of confidential data maintained on behalf of user 101 at computing system 130, such as slider elements 445, 446, and 447 associated with respective ones of the confidential customer profile data, account data, and transaction data maintained on behalf of user 101 at computing system 130. In some instances, a position of each of slider elements 445, 446, and 447 within display screen 436B may be indicative of an accessibility of the confidential customer profile data, account data, and transaction data to third-party application 114. For example, when rendered for presentation, slider element 445 may be disposed initially at position 445A within display screen 436B, which indicates that user 101 currently denies third-party application 114 access to any elements of confidential customer data maintained at computing system 130. Further, as illustrated in FIG. 4C, slider elements 446 and 447 may be disposed initially at respective ones of positions 446A and 447A, which indicates that user 101 grants third-party application 114 access to at least a portion of the confidential account and transaction data maintained at computing system 130.

Display screen 436B may also include additional interactive interface elements, such as slider elements 448 and 449, associated with the discrete elements of confidential account data maintained at computing system 130, such as account numbers, expiration dates, or other account identifiers (e.g., associated with slider element 448) and corresponding account balances (e.g., associated with slider element 449). Further, display screen 436B may include interactive interface elements, such as slider elements 450, 451, 452, and 453, associated with respective ones of the discrete elements of confidential transaction data maintained at computing system 130, such as, but not limited to: (i) a transaction type, value, and time for one or more transactions involving user 101 (e.g., slider element 450); (ii) a product or service involved in the one or more transactions (e.g., slider element 451); (iii) a counterparty or merchant involved in the one or more transactions; and (e.g., slider element 452); and a payment instrument involved in the one or more transactions (e.g., slider element 453). Display screen 436B may also include interface elements, such as "SUBMIT" element 454, that, when selected by user 101 through provided input, confirms a modification to the level of access granted to third-party application 114.

In some instances, when rendered for presentation by display unit 116A, an initial disposition of each of slider elements 448, 449, 450, 451, 453, and 453 within display screen 436B may be indicative of an accessibility of the corresponding elements of confidential account and transaction data to third-party application 114 (e.g., as specified within consent document 418). For example, as illustrated in FIG. 4C, slider element 448 may be disposed initially at position 448A within display screen 436B, which indicates that user 101 currently denies third-party application 114 access to the confidential account numbers, expiration dates, or other account identifiers, and slider element 449 may be disposed initially at position 449A within display screen 436B, which indicates that user 101 currently grants third-party application 114 access to the confidential account balances. Further, slider element 450 may be disposed initially at position 450A within display screen 436B, which indicates that user 101 currently grants third-party application 114 access to the confidential transaction type, value, and time for the one or more transactions involving user 101, and slider elements 451, 452, and 453 may be disposed initially at respective ones of positions 451A, 452A, and 453A within display screen 436B, which indicates that user 101 currently denies third-party application 114 access to the confidential transaction data identifying the products or services, counterparties, and payment instruments associated with the one or more transactions involving user 101.

Figure 4D:
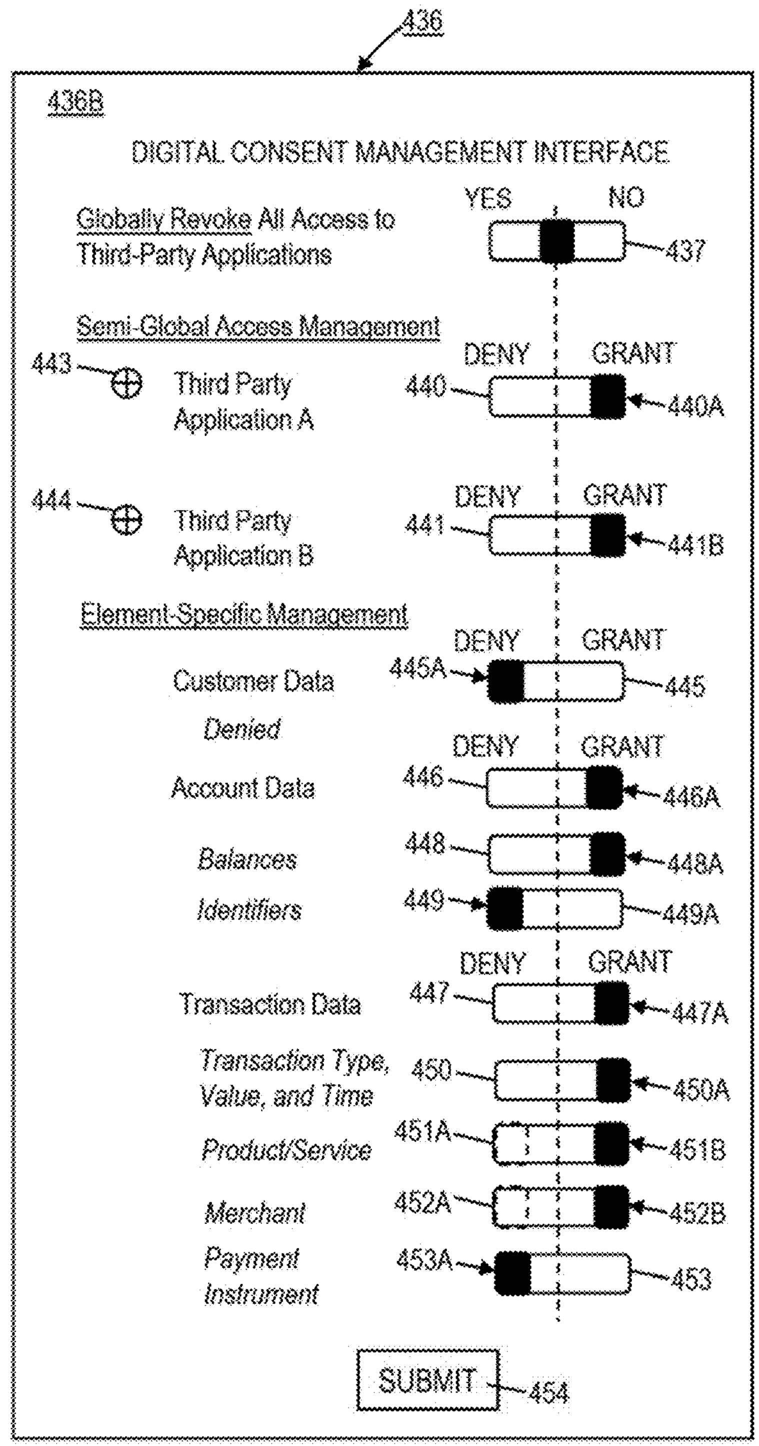

In some exemplary embodiments, may provide further input to client device 102 (e.g., via input unit 116B) indicative of an intention to modify the level of access to the confidential customer profile, account, or transaction data currently granted to third-party application 114. For example, as illustrated in FIG. 4D, the provided further input may re-position slider elements 451 and 452 from positions 451A and 452A to positions 451B and 452B within display screen 436, which collectively indicate an intention to grant third-party application 114 access to the confidential transaction data identifying the products or services and counterparties associated with the one or more transactions, e.g., as maintained on behalf of user 101 at computing system 130. The further provided input may also indicate a selection of "SUBMIT" element 454.

Figure 4E:
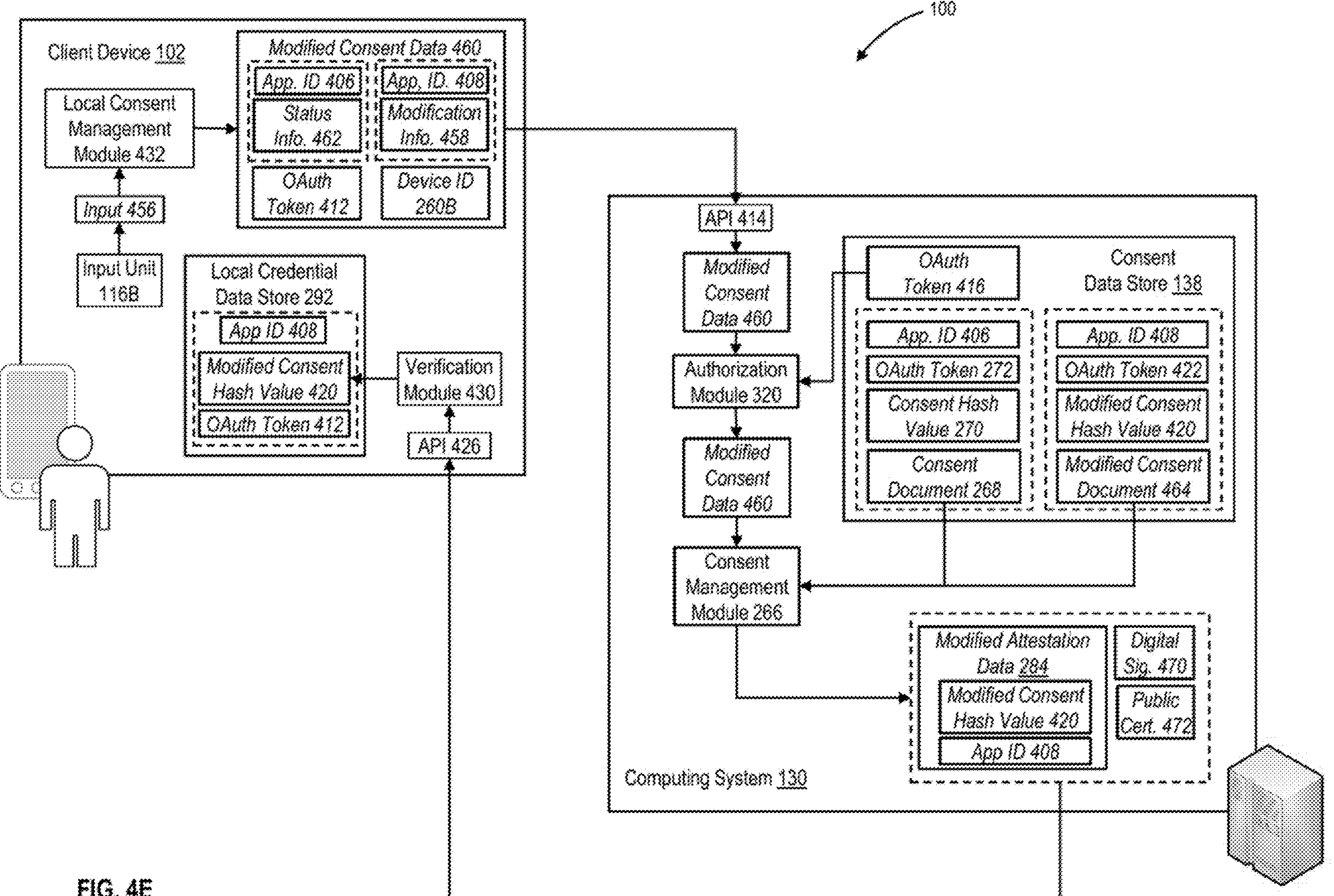
FIG. 4E is a diagram illustrating a portion of an exemplary computing environment, in accordance with some embodiments.

Referring to FIG. 4E, executed local consent management module 432 may receive the further provided input, e.g., additional input 456, via input unit 116B. In some instances, executed local consent management module 432 may parse additional input 456 to identify the selection of "SUBMIT" element 454, which confirms the modification requested by user 101 to the level of access granted to executed third-party application 114. Executed local consent management module 432 may further parse additional input 456 to extract modification information 458 that identifies: (i) the selective repositioning of slider element 451 from position 451A to position 451B, which indicates an intention by user 101 to grant third-party application 114 access to the elements of the confidential transaction data that specifies the products or services associated with the one or more transactions; and (ii) the selective repositioning of slider element 452 from position 452A to position 452B, which indicates an intention by user 101 to grant third-party application 114 access to the elements of the confidential transaction data that specify the counterparties associated with the one or more transactions. In some instances, executed local consent management module 432 may package modification information 458 into a corresponding portion of modified consent data 460, along with application identifier 408 of third-party application 114.

Further, and as described herein, user 101 may intend to maintain the level of access to confidential data currently granted to third-party application 112, e.g., the global denial of access to the elements of confidential customer profile data, the global grant of access to the elements of confidential account data, and the selective grant of access to the elements of confidential transaction data characterizing the transaction type, value, and time for the one or more transactions involving user 101. In some instances, and based on the parsing of additional input 456, executed local consent management module 432 may fail to detect any requested modification to the level of consent granted to third-party application 112, and may generate a status information 462 (e.g., a flag, etc.) indicative of the intention of user 101 to maintain the level of access currently granted to third-party application 112. As illustrated in FIG. 4E, executed local consent management module 432 may package status information 462 into a corresponding portion of modified consent data 460, along with application identifier 406 of third-party application 112, and executed mobile banking application 110 may perform operations that cause client device 102 to transmit modified consent data 460 across network 120 to computing system 130 using any appropriate communications protocol, e.g., via a corresponding programmatic interface, such as API 318.

Modified consent data 460 may also include OAuth token 412 of executed mobile banking application 110 and in some instances, a unique device identifier 260B of client device 102 (e.g., an IP address, a MAC address etc.). Further, although not illustrated in FIG. 4E, executed local consent management module 432 may also perform any of the exemplary processes described herein to apply a digital signature to all or a portion of modified consent data 460, and executed mobile banking application 110 may perform operations that cause client device 102 to transmit modified consent data 460, the applied digital signature, and a public key certificate of mobile banking application 110 (which includes a corresponding public key) across network 120 to computing system 130, e.g., via API 318 of executed consent and permissioning engine 142.

For example, API 414 may receive and route modified consent data 460 (e.g., either alone or in conjunction with the applied digital signature and the public key certificate) to authorization module 320 of executed consent and permissioning engine 142. In some instances, and prior to routing modified consent data 460 to authorization module 320, API 318 may perform operations (not illustrated in FIG. 4E) that parse modified consent data 460, extract OAuth token 412, and perform any of the exemplary initial pre-validation processes described herein to determine that a format or structure of OAuth token 412 conforms with an expected token format or structure.

Based on an established consistency between the format or structure of OAuth token 412 and the expected structure or format, API 414 may route modified consent data 460 (e.g., either alone or in conjunction with the applied digital signature and the public key certificate) to authorization module 320 of executed consent and permissioning engine 142. Executed authorization module 320 may perform any of the exemplary processes described herein to validate OAuth token 412 based on a comparison, and a determined consistency, with a reference locally maintained within consent data store 138 on behalf of executed mobile banking application 110, e.g., OAuth token 416. In some instances, and prior to validating OAuth token 412, executed authorization module 320 may establish an integrity of modified consent data 460 based on a validation of the applied digital signature using any of the exemplary processes described herein, e.g., based on the public cryptographic key included within the public key certificate.

For example, if executed authorization module 320 were to detect an inconsistency between OAuth token 412 (e.g., as extracted from modified consent data 460) and OAuth token 416 (e.g., as maintained within consent data store 138), executed authorization module 320 may decline to validate OAuth token 412 and may reject modified consent data 460. Executed authorization module 320 may perform any of the exemplary processes described herein that generate and transmit an error message across network 120 to client device 102, e.g., via a programmatic interface (not illustrated in FIG. 4E).

In other instances, if executed authorization module 320 were to determine that OAuth token 412 corresponds to or matches OAuth token 416, authorization module 320 may validate OAuth token 412 and modified consent data 460. Responsive to the successful validation, executed authorization module 320 may provide modified consent data 460 as an input to consent management module 266 of executed consent and permissioning engine 142, which may perform any of the exemplary processes described herein to identify the requested modification to, or revocation of, the level of consent previously granted to one or more third-party applications executable at client device 102 (e.g., based on modified consent data 460), and to generate, for each of the one or more third-party applications, a modified consent document that reflects the requested modification without invalidating a currently pending OAuth token associated with each of the one or more third-party applications.

By way of example, executed consent management module 266 may parse modified consent data 460 to identify application identifier 406 of third-party application 112, and perform operations that may extract status information 462 associated with, or linked to, application identifier 406 within modified consent data 460. In some instances, executed consent management module 266 may process status information 462, and based on a format or structure of status information 462, or based on a content of status information 462, detect the intention of user 101 to maintain the level of access currently granted to third-party application 112. Based on the detected intention, executed consent management module 266 may maintain the pendency and validity of consent document 268, consent hash value 270, and OAuth token 272 associated with, or linked to, application identifier 406 within consent data store 138.

Executed consent management module 266 may further parse modified consent data 460 to identify application identifier 408 of third-party application 114, and perform operations that may extract modification information 458 associated with, or linked to, application identifier 408 within modified consent data 460. Executed consent management module 266 may process modification information 458 to identify one or more requested modifications to the level of access previously granted to third-party application 114, the intention of user 101 to grant third-party application 114 access to the elements of the confidential transaction data that specifies the products or services and the counterparties associated with the one or more transaction. Executed consent management module 266 may also access consent data store 138, and perform additional operations that extract consent document 418, which may be associated with application identifier 408 of third-party application 114.

In some instances, executed consent management module 266 may perform operations that modify portions of consent document 418 in accordance corresponding portions of modification information 458, and that generate a modified consent document 464 that reflects the requested modifications to the level of access previously granted to third-party application (e.g., that includes both the modified portions of consent document 481, and any unchanged portions of consent document 418). Further, executed consent management module 266 may also generate a modified consent hash value 466 based on an application of any of the exemplary hash algorithms described herein to all or a selected portion of modified consent document 464.

For example, modified consent document 464 may indicate that: (i) user 101 continues to deny third-party application 114 access to elements of confidential customer data maintained at computing system 130; (ii) user 101 continues to grant third-party application 114 access to elements of confidential account data that identify the account balances of the one or more financial services accounts issued to user 101 by the financial system associated with computing system 130; and (iii) user 101 now grants third-party application 114 access to elements of confidential transaction data characterizing not only the transaction type, value, and time for the transactions involving the one or more financial services accounts, but also to the products or services and counterparties associated with these transactions. As described herein, modified consent document 464 may also be formatted in accordance with one or more data-interchange formats, such as, but are not limited to, a JavaScript Object Notation (JSON) format, a YAML format, an Internet-JSON (I-JSON) format, an XML format, or any additional or alternate language-independent, data serialization formats.

Executed consent management module 266 may perform operations that store, within consent data store 138, modified consent document 464 and modified consent hash value 466 in conjunction with application identifier 408, which identifies third-party application 114, and previously generated OAuth token 422, which confirms an authorization of third-party application 114 to access programmatic interfaces established and maintained by computing system 130. Certain of these exemplary decoupled consent and authorization processes, which enable a user to selectively modify a level of access granted previously to third-party application 114 (or other third-party applications executed by client device 102) without invalidated a corresponding OAuth token, may be implemented in addition to, or as an alternate to, conventional token-based consent and authorization protocols, which couple together a global revocation of the level of access previously granted to third-party application 114 and a generation of a new OAuth token representative of a level of access newly granted to third-party application 114 by user 101.

In some examples, executed consent management module 266 may perform operations that replace, e.g., overwrite, consent document 418 and consent hash value 420 with corresponding ones of modified consent document 464 and modified consent hash value 466 in consent data store 138. In other examples, executed consent management module 266 may store application identifier 408, modified consent document 464, modified consent hash value 466, and OAuth token 422 within an additional portion of consent data store 138, e.g., in conjunction with a corresponding time stamp or other data element that establishes a record of each consent document and consent hash value associated with third-party application 114.

In other examples (not illustrated in FIG. 4E), executed consent management module 266 may perform operations that package application identifier 408, modified consent document 464, and modified consent hash value 466 into corresponding portions of recordation data. Executed consent management module 266 may further apply a digital signature to the recordation data, e.g., using a private cryptographic key of computing system 130, and may perform operations that cause computing system 130 to broadcast the recordation data, the applied digital signature, and a public key certificate of computing system 130 (e.g., that includes a corresponding public cryptographic key) to one or more of peer systems 180, including peer system 182, which may perform any of the exemplary processes described herein to validate the applied digital signature (e.g., based on the public cryptographic key included within the public key certificate) and generate an additional element of distributed ledger 186 that includes application identifier 408, modified consent document 464, and modified consent hash value 466.

By way of example, peer system 182 may successful compute a corresponding, consensus-based proof-of-work or proof-of-stake, may generate an updated distributed ledger to which the additional element is appended (e.g., a latest, longest version of the distributed ledger), and may broadcast the updated distributed ledger across network 120 to additional ones of peer systems 180 and further, to other participants in a distributed-ledger network, such as computing system 130, for storage in one or more tangible, non-transitory memories. In some instances, the recordation of application identifier 408, modified consent document 464, and modified consent hash value 466 within the updated distributed ledger may establish an immutable, and cryptographically secure record of the temporal evolution in the level of consent granted to third-party application by user 101.

Referring back to FIG. 4E, executed consent management module 266 may generate modified attestation data 468 that includes modified consent hash value 466 and application identifier 408 of third-party application 114 (and in some instances, all or a portion of modified consent document 464). In some instances, executed consent management module 266 may apply a digital signature 470 to modified attestation data 468 using any appropriate digital signature algorithm in conjunction with a private cryptographic key of computing system 130 (e.g., to further verify an integrity of modified attestation data 468 during transmission across unsecured communications channels), and may perform operations that cause computing system 130 to transmit modified attestation data 468, digital signature 470 and a public key certificate 472 of computing system 130 (e.g., that includes a corresponding public cryptographic key) across network 120 to client device 102 using any appropriate communications protocol, e.g., via the corresponding communications interface, such as the transceiver device.

In some instances, API 427 of executed mobile banking application 110 may receive and route modified attestation data 468, digital signature 470 and a public key certificate 472 to verification module 430 of executed mobile banking application 110. In some instances, executed verification module 430 may perform any of the exemplary processes described herein to validate digital signature 470 based on the public cryptographic key of computing system 130 included within public key certificate 472. Based on the successful validation of digital signature 470, executed verification module 430 may provide modified attestation data 468 as an input to local consent management module 432 of executed mobile banking application 110, which may perform operations that store modified consent hash value 466 (and in some instances, all or a portion of modified consent document 464) within a portion of local credential data store 292 accessible to third-party application 114, e.g., upon execution by processor 104. As illustrated in FIG. 4E, modified consent hash value 466 (and in some instances, all or a portion of modified consent document 464) may be stored in conjunction with previously generated, existing, and currently valid OAuth token 474 of third-party application 114, which may be generated and provisioned to client device 102 by computing system 130 using any of the exemplary processes described herein.

Certain of the exemplary embodiments, including those described herein in reference to FIGS. 4A-4E, are described in terms of one or more exemplary application programs executed at client device 102, such as mobile banking application 110. In other examples, the certain operations performed by executed mobile banking application, as described herein, may also be performed by other application programs executed by client device 102, such as an web browser program that, upon execution of by client device 102, performs processes that generate and display one or more of the exemplary digital consent management interfaces described herein.

Figure 5:
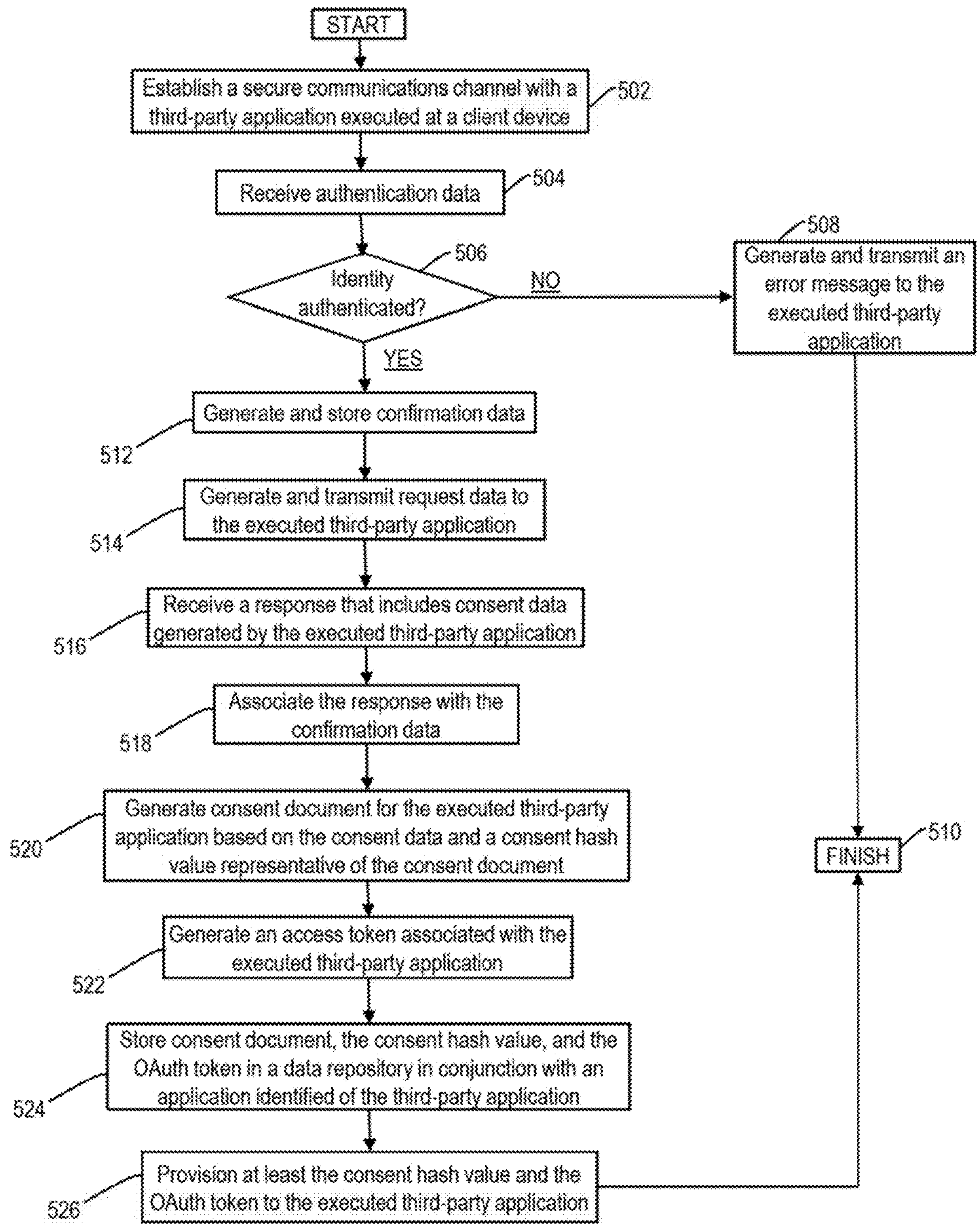
FIGS. 5-7 are flowcharts of exemplary processes for dynamically implementing and managing hash-based consent and permissioning processes, in accordance with some embodiments.

FIG. 5 is a flowchart of an exemplary process 500 for dynamically implementing hash-based consent and permissioning protocols, in accordance with disclosed exemplary embodiments. In some instances, a network-connected computing system operating within environment 100, such as computing system 130, may perform one or more of the steps of exemplary process 500. Further, and as described herein, computing system 130 may perform one or more of the steps of exemplary process 500 based on data exchanged across a secure communications channel with a third-party application executed at a network-connected computing device or system, such as third-party application 112 or third-party application 114 executed at client device 102.

Referring to FIG. 5, computing system 130 may perform operations that establish a secure channel of communications across network 120 with third-party application 112 (or third-party application 114) executed at client device 102 (e.g., in step 502). In some instances, the secure communications channel may be established through one or more programmatic interfaces established or maintained by computing system 130, such as, but not limited to application programming interface (API) 204, as described herein.

In some instances, computing system 130 may receive authentication data from client device 102 across network 120 (e.g., in step 504). As described herein, the received authentication data may include one or more authentication credentials that uniquely identify user 101 of client device 102 at computing system 130 and a unique device identifier of client device 102 (e.g., an IP address, a MAC address, etc.). Computing system 130 may perform any of the exemplary processes described herein to extract the one or more authentication credentials from the authentication data, and to authenticate an identity of user 101 based on a comparison between the one or more extracted authentication credentials and the corresponding reference authentication credentials maintained at computing system 130 (e.g., in step 506).

If, for example, computing system 130 were to establish an inconsistency between the extracted and local authentication credentials (e.g., step 506; NO), computing system may decline to authenticate the identity of user 101 and may decline to grant the executed third-party application (e.g., third-party application 112 or 114) access to computing system 130. In step 508, computing system 130 may perform operations that generate and transmit an error message across network 120 to client device 102, and exemplary process 500 may then be complete in step 510.

In other instances, computing system 130 may establish a consistency between the extracted and local authentication credentials, and may authenticate an identity of user 101 (e.g., step 506; YES). Responsive to the successful authentication, computing system 130 may generate and store confirmation data (e.g., a data flag, etc.) indicative of the successful authentication within an accessible data repository, such as user database 134, in conjunction with the authentication credentials of user 101 (e.g., as a user identifier) or the device identifier of client device 102 (e.g., in step 512).

Computing system 130 may also perform operations that generate, and transmit data that requests an initiation of one or more of the exemplary decoupled consent and permissioning processes described herein across network 120 to client device 102 (e.g., in step 514). By way of example, and as described herein, the generated and transmitted request data may include information that identifies certain types or classes of confidential data maintained on behalf of user 101 by computing system 130 (e.g., confidential profile, account, or transaction data, etc.), along with certain data elements associated with each of the types or classes.

Client device 102 may receive the request data through a corresponding programmatic interface. In some instances, the third-party application executed at client device 102 (e.g., executed third-party applications 112 or 114) may perform any of the exemplary processes described herein to generate one or more display screens of a digital consent interface, which prompt user 101 to provide input to client device specifying a level of access to the confidential customer, account, or transaction data maintained on behalf of user 101 by computing system 130 granted the executed third-party application by user 101, e.g., on a global basis, on a semi-global basis (e.g., on a class- or type-specific basis), or on an element-by-element basis.

Referring back to FIG. 5, computing system 130 may receive a response to the transmitted request from client device 102 across network 120 via the secure communications channel (e.g., in step 516). In some instances, the received response may include consent data that identifies and characterizes the level of access granted to the executed third-party application (e.g., third-party application 112 or 114 executed at client device 102) by user 101. The consent data may, for example, include information that identifies one or more classes, types, or discrete elements of the confidential customer, account, and transaction data that are accessible to, or inaccessible to, the executed third-party application. Further, the received response may also include a unique user identifier of user 101, a unique device identifier of client device 102 (and a unique application identifier of the executed third-party application.

In step 518, computing system 130 may perform operations that associate the received response with a prior and successful authentication of the identity of user 101, e.g., based on one or more of the user or device identifiers and the confirmation data. Responsive to the association of the received response with the prior and successful authentication, computing system 130 may perform any of the exemplary processes described herein to generate an application-specific consent document that reflects a level of access granted by user 101 to the executed third-party application (e.g., in step 520). In some instances, and as described herein, computing system 130 may package all or a portion of the consent data (e.g., as extracted from the received response) into corresponding portions of the application-specific consent document, which may be formatted in accordance with a data interchange format.

Further, in step 520, computing system 130 may also perform any of the exemplary processes described herein to compute an application-specific consent hash value representative of the application-specific consent document, e.g., based on an application of any of the hash algorithms described herein to all or a selected portion of the application-specific consent document, either alone or in conjunction within additional data. In some instances, computing system 130 may perform any of the exemplary processes described herein to generate an access token, e.g., an OAuth token, indicative of the successful authentication of the identity of user 101 and of the permission of the third-party application to access one or more programmatic interfaces established or maintained by computing system 130 (e.g., in step 522).

Computing system 130 may also perform any of the exemplary processes described herein to store, within a locally or remotely accessible data repository, the application-specific consent document, the application-specific consent hash value, and the OAuth token in conjunction with the user, device, and application identifiers, and additionally, or alternatively, to record the application-specific consent document, the application-specific consent hash value, and the application identifier within an additional ledger block of a distributed ledger (e.g., in step 524). In step 526, computing system 130 may perform any of the exemplary processes described herein to provision the application-specific consent hash value, the OAuth token, and in some instances, all or a portion of the application-specific consent document, to the third-party application executed at client device 102. Exemplary process 500 may then pass back to step 510, and exemplary process 500 is complete.

Figure 6:
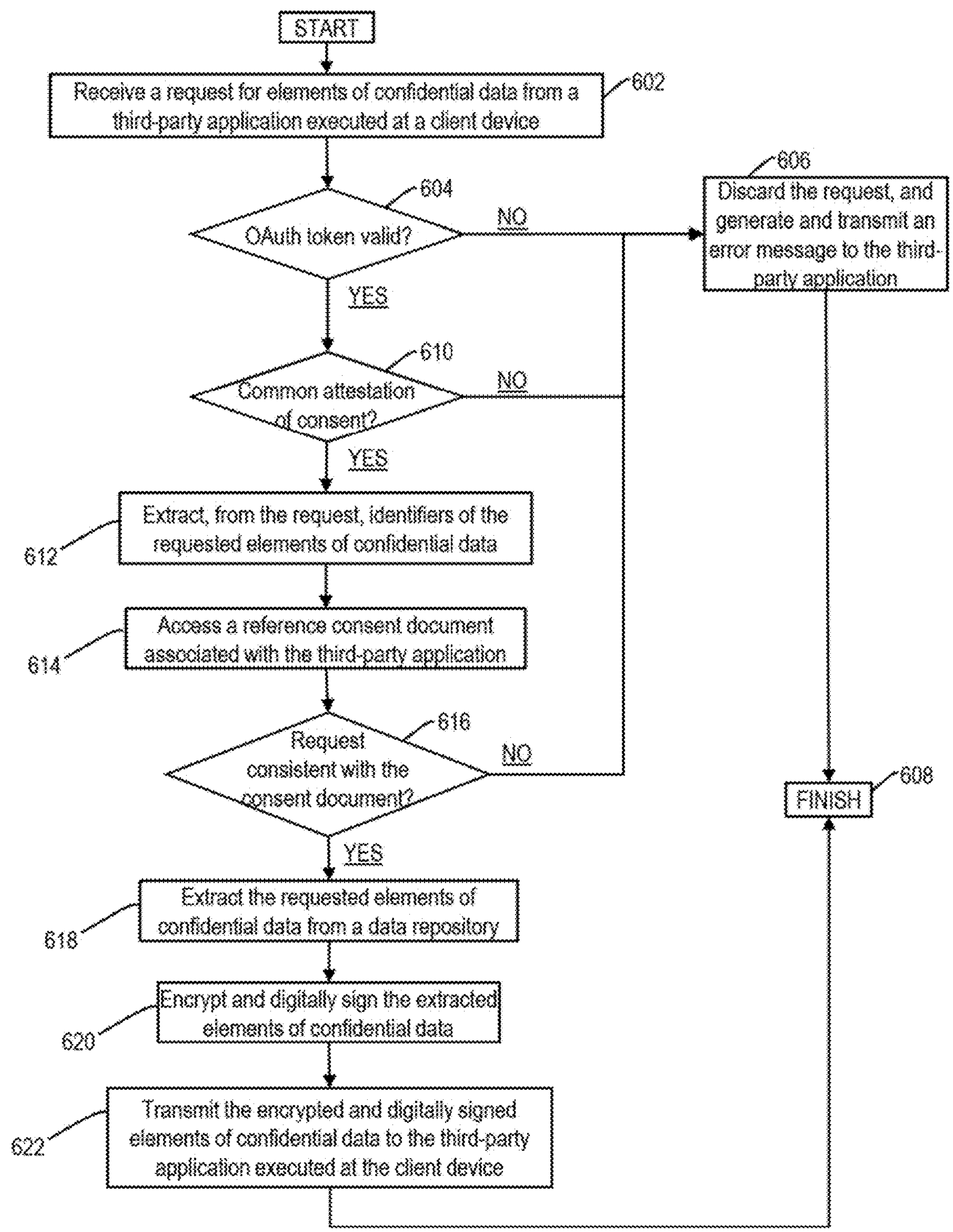

FIG. 6 is a flowchart of an exemplary process 600 for dynamically managing hash-based consent and permissioning protocols, in accordance with disclosed exemplary embodiments. In some instances, a network-connected computing system operating within environment 100, such as computing system 130, may perform one or more of the steps of exemplary process 600. Further, and as described herein, computing system 130 may perform one or more of the steps of exemplary process 500 based on data exchanged across a secure communications channel with a third-party application executed at a network-connected computing device or system, such as third-party application 112 or third-party application 114 executed at client device 102.

Referring to FIG. 6, computing system 130 may receive, from client device 102 across network 120, a request for to access one or more elements of confidential data (e.g., in step 602). In some instances, the request may be generated by the third-party application executed at client device 102, such as third-party application 112 or third-party application 114, and the requested elements of confidential data may include one or more of the elements of confidential profile, account, and transaction data maintained by computing system 130 on behalf of user 101 of client device 102. The received request may, for example, include an identifier of each of the requested elements of confidential data, and may further include information that identifies and characterizes one or more operations involving the requested elements of confidential profile, account, and transaction data.

Further, in some instances, the received request may include information that identifies, characterizes, or is representative of a level of access to the elements of confidential profile, account, and transaction data granted to the executed third-party application by user 101. For example, the received request may include an application-specific consent hash value representative of a corresponding application-specific consent document, which includes information that identifies one or more types, classes, or discrete elements of confidential data accessible to the executed third-party application program. As described herein, the application-specific consent hash value may also represent an attestation, by the executed third-party application, of the level of access to confidential data currently granted to the third-party application by user 101, e.g., using any of the exemplary decoupled consent and authorization processes described herein. In other examples, the received request may include all or a portion of the corresponding, application-specific consent document, either in addition to, or as an alternate to, the application-specific consent hash value.

The received request may also include an OAuth token associated with the executed third-party application. The OAuth token may, for example, be indicative of an authentication of an identity of user 101 by computing system 130 and an authorization of the executed third-party application to access one or more programmatic interfaces established and maintained by computing system 130. As described herein, the OAuth token may be generated by, and provisioned to client device 102, by computing system 130 based on a successful outcome of any of the exemplary decoupled authorization and consent processes described herein.

In some instances, computing system 130 may parse the request to extract the OAuth token associated with the executed third-party application, and may perform any of the exemplary processes described herein to validate the extracted OAuth token based on a determined consistency with a locally accessible reference OAuth token associated with the executed third-party application (e.g., in step 604). For example, if computing system 130 were to detect an inconsistency between the extracted and reference OAuth tokens, computing system 130 may decline to validate the extracted OAuth token (step 604; NO), and computing system 130 may decline to grant the third-party application access to the requested elements of confidential data and may discard the request (e.g., in step 606). Computing system 130 may also perform operations that generate and transmit an error message across network 120 to client device 102 (e.g., also in step 606). Exemplary process 600 is then complete in step 608.

If, however, computing system 130 were to establish a consistency between the extracted and reference OAuth tokens (step 604; YES), computing system 130 may validate the extracted OAuth token, and may perform operations that determine whether the executed third-party application and computing system 130 each attest to a common level of access previously granted third-party application 112 by user 101 (e.g., in step 610). For example, in step 610, computing system 130 may extract the consent hash value associated with the executed third-party application from the now-validated request, and may perform any of the exemplary processes described herein to obtain, from an accessible data repository, a reference consent hash value associated with the executed third-party application. In other examples, in step 610, computing system 130 may obtain the reference consent hash value from one or more elements of a distributed ledger maintained locally by, or available to, computing system 130, e.g., using any of the exemplary processes described herein.

By way of example, if computing system 130 were to establish an inconsistency between the extracted and reference consent hash values associated with the executed third-party application, computing system 130 may determine that the executed third-party application attests to a level of access to confidential data that differs from, and is inconsistent with, the level of access to which computing system 130 attests (step 610; NO). Exemplary process 600 may pass back to step 606, and computing system 130 may decline to granted the executed third-party application access to the requested elements of confidential data, and may discard the request. Computing system 130 may also perform operations that generate and transmit an error message across network 120 to client device 102 (e.g., in also in step 606).

In some instances, and based on the established inconsistency, computing system 130 may also perform operations any of the exemplary processes described herein to provision, to the executed third-party application, additional information that confirms the level of access to confidential data currently granted to the executed third-party application by user 101, such as, but not limited to, the reference consent hash value or portions of a corresponding consent document. For example, computing system 130 may package the reference consent hash value and/or the portions of the corresponding consent document within the generated error message (e.g., in step 606). Exemplary process 600 is then complete in step 608

In other examples, if computing system 130 were to determine that extracted consent hash value corresponds to, and matches, the reference consent hash value, computing system 130 may determine that the executed third-party application and computing system 130 attest to a common level of granted access (step 610; YES). Based on the attestation to the common level of granted access, computing system 130 may parse the now-validated request to extract the identifiers of the requested elements of confidential data (e.g., in step 612), and may perform operations that extract, from an accessible data repository, all or a selected portion of a reference consent document 268 associated with the executed third-party application (e.g., in step 614).

In some instances, and based on the extracted data identifiers and the reference consent document, computing system 130 may perform any of the exemplary processes described herein to determine whether the one or more elements of confidential data requested by third-party application are consistent with the type or level of access previously granted to executed third-party application by user 101 (e.g., in step 616). For example, in step 612, and based on a comparison between the reference consent document and the data identifiers, computing system 130, may determine whether each of the requested elements of confidential data (e.g., as specified by the data identifiers) is consistent with the level of access previously granted to the executed third-party application by user 101 (e.g., as specified within the reference consent document).

If, for example, computing system 130 were to detect an inconsistency between the previously granted level of access and the requested elements of confidential data, computing system 130 may determine that the now-validated request is inconsistent with the previously granted level of access (step 616; NO). Exemplary process 600 may pass back to step 606, and may decline to granted the executed third-party application access to the requested elements of confidential data, and may discard the request. In some instances, computing system 130 may perform operations that generate and transmit an error message across network 120 to client device 102 (e.g., also in step 606). Exemplary process 600 is then complete in step 608.

Alternatively, if computing system 130 were to establish a consistency between the previously granted level of access and at least the subset of the requested elements of confidential data (e.g., step 616; YES), computing system 130 may perform any of the exemplary processes described herein to extract least the subset of the requested elements of confidential data from an accessible data repository (e.g., in step 618). Further, and as described herein, computing system 130 may encrypt the extracted elements of confidential data using a public cryptographic key associated with or assigned to the executed third-party application and in some instances, may apply a digital signature to the encrypted elements of confidential data using any appropriate digital signature algorithm in conjunction with a private cryptographic key of computing system 130 (e.g., in step 620). Computing system 130 may transmit the encrypted and digitally signed elements of confidential data across network 120 to client device 102 using any appropriate communications protocol (e.g., in step 622). Exemplary process 600 is then complete in step 608.

Figure 7:
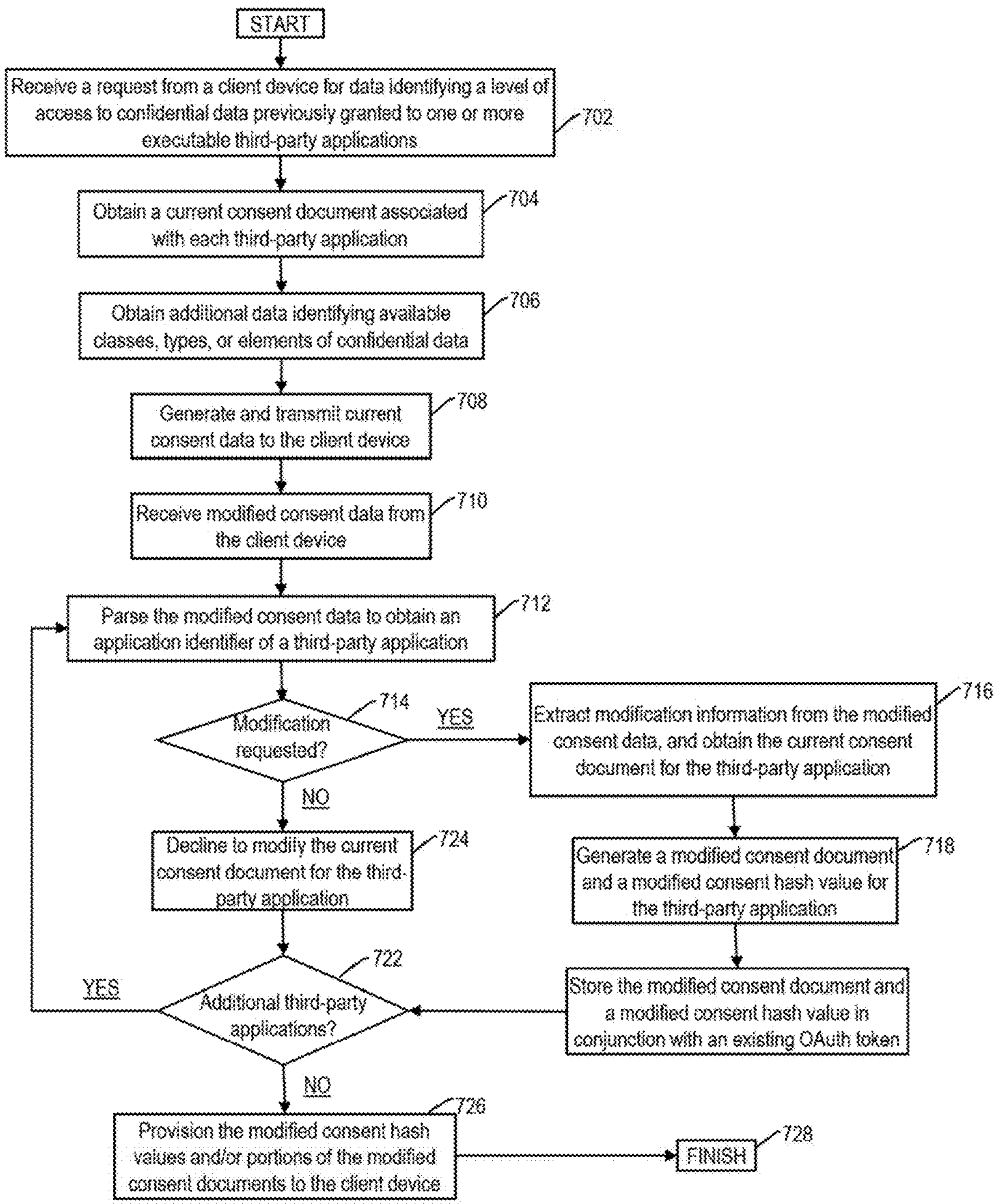

FIG. 7 is a flowchart of an exemplary process 700 for dynamically managing hash-based consent and permissioning protocols, in accordance with disclosed exemplary embodiments. In some instances, a network-connected computing system operating within environment 100, such as computing system 130, may perform one or more of the steps of exemplary process 700. Further, and as described herein, computing system 130 may perform one or more of the steps of exemplary process 700 based on data exchanged across a secure communications channel with one or more application programs executed at a network-connected computing device or system, such as, but not limited to, a mobile banking application 110 or a web browser executed at client device 102.

Referring to FIG. 7, computing system 130 may receive a request, from client device 102, for consent data identifying and characterizing a level of access to confidential data previously granted by user 101 to one or more third-party applications executable at client device 102, such as, but not limited to, executable third-party applications 112 and 114 described herein (e.g., in step 702). The received request may include a unique application identifier of each of the executable third-party applications, and in some instances, may be generated by executed mobile banking application 110 or by the executed web browser in response to a successful authentication of an identity of user 101, e.g., using any of the exemplary processes described herein.

The received request may also include an OAuth token indicative of the successful authentication of the identity of user 101 and of an authorization of the one or more executed application programs, such as executed mobile banking application 110, to access programmatic interfaces established or maintained by computing system 130. In some instances (not illustrated in FIG. 7), computing system 130 may perform any of the exemplary processes described herein to verify the OAuth token included within the received request based on a comparison with a reference OAuth token locally maintained within an accessible data repository.

In some examples, computing system 130 may extract the application identifiers of each of the executable third-party applications, and based on the may perform any of the exemplary processes described herein to identify and obtain a current consent document and a current consent hash value associated with each extracted application identifier and as such, each executable third-party application (e.g., in step 704). Further, computing system 130 may perform any of the exemplary processes described herein to obtain additional information identifying certain types, classes, or elements of confidential customer, account, and transaction data that are maintained on behalf by user 101 by computing system 130 and as such, that are potentially accessible to each of the one or more third-party applications, when executed at client device 102 (e.g., in step 706).

Additionally, computing system 130 may perform any of the exemplary processes described herein to generate current consent data that associates each consent document with a corresponding identifier of a third-party application program executed at client device 102 (e.g., third-party applications 112 or 114, etc.) and further, that includes the additional information identifying the potentially available classes, types, or discrete elements of confidential customer, account, and transaction data (e.g., in step 708). Further, in step 708, computing system 130 may perform operations that digitally sign to the current consent data, and that transmit the digitally signed current consent data across network 120 to client device 102.

As described herein, client device 102 may receive the digitally signed current consent data through a corresponding programmatic interface. In some instances, the one or more application programs executed by client device 102, e.g., executed mobile banking application 110 or the executed web browser, may validate the digital signature applied to the current consent data, and may perform any of the exemplary processes described herein to process the current consent data and generate one or more display screens of a digital consent management interface, which prompts user 101 to provide input to client device modifying a level of access to the confidential customer, account, or transaction data previously granted to one or more of the executed third-party applications, e.g., on a global basis, on a semi-global basis (e.g., on an application-specific basis, or on a class- or type-specific basis), or on an element-by-element basis.

In step 710, computing system 130 may receive modified consent data from client device 102, e.g., across network 120 through a corresponding programmatic interface. In some instances, the modified consent data may be generated by the one or more application programs executed by client device 102 (e.g., executed mobile banking application 110 or the executed web browser) based on input provided by user 101 (e.g., to client device 102 via input unit 1166) in response to the one or more display screens of the digital consent management interface.

As described herein, the modified consent data may associate the unique application identifier of each of the one or more executable third-party applications (e.g., third-party applications 112 or 114) with either: (i) elements of modification information that identify a requested modification to the level of access to confidential data previously granted by user 101 to an executable third-party application associated with the unique application identifier; or (ii) elements of status information indicative of an intention to maintain the level of access to confidential data previously granted by user 101 to the that executable third-party application. In some instances, a digital signature may be applied to the modified consent data, and although not illustrated in FIG. 7, computing system 130 may perform any of the exemplary processes described herein to validate the applied digital signature and as such, to validate an integrity of the modified consent data received from client device 102.

Further, the modified consent data may also include an additional OAuth token indicative of the successful authentication of the identity of user 101 and of an authorization of the one or more executed application programs, such as executed mobile banking application 110, to access programmatic interfaces established or maintained by computing system 130. In some instances (not illustrated in FIG. 7), computing system 130 may perform any of the exemplary processes described herein to verify the additional OAuth token included within the received request based on a comparison with a reference OAuth token locally maintained within an accessible data repository.

In some instances, computing system 130 may parse the modified consent data and access the unique application identifier of a corresponding third-party application executable at client device 102, such as, but not limited to, third-party applications 112 or 114 (e.g., in step 712). Based on the accessed unique application identifier, computing system 130 may perform further operations that determine whether the modified consent data specifies a requested modification to the level of access to confidential data previously granted by user 101 to the corresponding executable third-party application (e.g., in step 714).

For example, and based on portions of the modified consent data, computing system 130 may establish an association between the accessed application identifier and one or more elements of modification information, which specify the requested modification to the corresponding third-party application. Responsive to the established association between the accessed application identifier and the modification information, computing system 130 may determine that modified consent data specifies a requested modification (e.g., step 714; YES), and computing system 130 may perform operations that extract the modification information associated with the accessed application identifier from the modified consent data (e.g., in step 716). Computing system 130 may also obtain, from an accessible data repository (e.g., consent data store 138 of FIG. 1), an existing consent document associated with the accessed application identifier and as such, the corresponding executable third-party application (e.g., also in step 716). As described herein, the existing consent document may identify and characterize the level of access to confidential data previously granted to the corresponding executable third-party application by user 101.

In some examples, computing system 130 may perform any of the exemplary processes described herein to generate a modified consent document for the corresponding executable third-party application based on the extracted modification information and the existing consent document, and to generate a modified consent hash value that represents all or a portion of the modified consent document (e.g., in step 718). The modified consent document may, for example, reflect the requested modification to the level of access to confidential data previously granted by user 101 to the corresponding executable third-party application, and computing system 130 may generate the modified consent document and the modified consent hash value without invalidating an existing OAuth token associated with the corresponding executable third-party application.

Computing system 130 may also perform any of the exemplary processes described herein to store, within the accessible data repository (e.g., consent data store 138), the modified consent document and the modified consent hash value in conjunction with the accessed application identifier, which identifies the corresponding executable third-party application, and the existing OAuth token, which confirms an authorization of the corresponding executable third-party application to access programmatic interfaces established and maintained by computing system 130 (e.g., in step 720). Additionally, or alternatively, in step 720, computing system 130 may also perform any of the exemplary processes described herein to record the modified consent document, the modified consent hash value, and the accessed application identifier within an additional ledger block of a distributed ledger. Exemplary process 700 may then pass to step 722, and computing system 130 may perform further operations that parse the modified consent data to identify a presence of one or more additional application identifiers.

Referring back to step 174, and based on portions of the modified consent data, computing system 130 may establish an association between the accessed application identifier and one or more elements of status information, which specify the intention of user 101 to maintain the level of access to confidential data previously granted by user 101 to the corresponding executable third-party application. Responsive to the established association between the accessed application identifier and the status information, computing system 130 may determine that modified consent data fails to specifies a requested modification (e.g., step 174; NO), and computing system 130 may decline to modify the consent document associated with the corresponding executable third-party application (e.g., in step 724). Exemplary process 700 may then pass back to step 722, and computing system 130 may perform further operations that parse the modified consent data to identify a presence of one or more additional application identifiers.

If, for example, computing system 130 were to identify an additional application identifier within the modified consent data (step 722; YES), exemplary process 700 may pass back to step 714, and computing system 130 may perform any of the exemplary processes described herein to determine whether the modified consent data specifies a requested modification to the level of access to confidential data previously granted by user 101 to an executable third-party application associated with the additional application identifier. Alternatively, if computing system 130 were unable to identify any additional application identifiers within the modified consent data (e.g., step 722; NO), computing system 130 may perform any of the exemplary processes described herein to provision the each of the modified consent hash values, and in some instances, all or a portion of corresponding ones of the modified consent document, to client device 102, for storage in local data repository in conjunction with corresponding ones of the existing, and previously stored, OAuth tokens (e.g., in step 726). Exemplary process 700 is then complete in step 728.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, mobile banking application 110, third-party applications 112 and 114, consent and permissioning engine 142, local authorization and consent module 210, APIs 204, 208, 318, validation module 262, consent management module 266, local validation module 289, request management module 302, authorization module 320, consent verification module 322, consent detection module 324, provisioning module 330, data processing module 342, operations module 346, verification module 430, local consent management module 432, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms “apparatus,” “device,” and “system” refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. Computers consistent with the disclosed exemplary embodiments may include a CPU for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server may be disposed remote from each other and may interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

Similarly, while operations are depicted in the drawings in a particular order, this should not be understood as requiring that such operations be performed in the particular order shown or in sequential order, or that all illustrated operations be performed, to achieve certain results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:

a communications interface;

a memory storing instructions; and at least one processor coupled to the communications interface and the memory, the at least one processor being configured to execute the instructions to:

receive, via the communications interface, consent data from a device, the consent data identifying identifies one or more elements of data accessible to an application program executed by the device, and the consent data comprising an application identifier of the executed application program and data identifiers of the one or more data elements;

generate a consent document for the application program based on at least a portion of the consent data, the consent document comprising elements of status data that confirm an accessibility of corresponding ones of the data elements to the executed application program;

compute a consent hash value representative of the consent document; and generate and transmit, via the communications interface, permissioning data that includes the consent hash value to the device, the permissioning data comprising information that instructs the executed application program to store the consent hash value within a local memory of the device and to associate the consent hash value with an access token associated with the executed application program.

2. The apparatus of claim 1, wherein the at least one processor is further configured to transmit the permissioning data to the device through a programmatic interface associated with the executed application program.

3. The apparatus of claim 1, wherein the at least one processor is further configured to store the consent document and the consent hash value with the application identifier of the application program within a portion of the memory.

4. The apparatus of claim 3, wherein:

the access token comprises an OAuth token;

the at least one processor is further configured to generate the OAuth token and store the OAuth token, the consent document, the consent hash value, and the application identifier within the portion of the memory; and the permissioning data comprises the consent hash value and the access token.

5. The apparatus of claim 1, wherein the at least one processor is further configured to:

generate a recordation request that includes the consent document, the consent hash, and the application identifier of the application program;

transmit the generated recordation request to one or more peer systems via the communications interface, the recordation request comprising additional information that causes the one or more peer systems to perform operations that record the consent document, the consent hash, and the application identifier within an element of a distributed ledger; and receive at least a portion of the distributed ledger via the communications interface and store the received portion of the distributed ledger within the memory.

6. The apparatus of claim 1, wherein the at least one processor is further configured to:

receive modified consent data from the device via the communications interface, the modified consent data comprising modification information that identifies a requested modification to an accessibility of at least one of the data elements and the application identifier of the application program;

based on the application identifier, access a portion of the memory that includes the consent document, the consent hash value, and the access token associated with the executed application program;

obtain the consent document from accessed portion of the memory;

generate a modified consent document based on the modification information and the consent document, and generate a modified consent hash value representative of the modified consent document, the modified consent document reflecting the requested modification to the accessibility of the at least one of the data elements; and generate and transmit, via the communications interface, modified permissioning data that include the modified consent hash value to the device, the modified permissioning data comprising additional information that instructs the executed application program to store the modified consent hash value within the local memory of the device and to associate the modified consent hash value with the access token of the executed application program.

7. The apparatus of claim 6, wherein requested modification comprises at least one of (i) a modification to a level of access to the at least one of the data elements or (ii) a revocation of the access to the at least one of the data elements.

8. The apparatus of claim 6, wherein the at least one processor is further configured to store, within the portion of the memory, the modified consent document and the modified hash value in conjunction with the access token and the application identifier.

9. The apparatus of claim 1, wherein the at least one processor is further configured to:

receive, via the communications interface, a request for an element of data from the device, the request being generated by the executed application program executed at the device, and the request comprising a local consent hash value, the access token, and the application identifier;

validate the access token, and based on the validated access token, access a portion of the memory that includes the application identifier, the consent document, and the consent hash value associated with the application program;

determine that the local consent hash value corresponds to the consent hash value associated with the application program, and determine that the requested data element is accessible to the executed application program based on a corresponding one of the elements of status data associated with the requested data element;

based on the determination that the local consent hash value corresponds to the consent hash value and that the requested data element is accessible to the executed application, load the requested data element from the memory and encrypt the requested data element using a public cryptographic key associated of the executed application program; and transmit the encrypted data element to the device via the communications interface.

10. The apparatus of claim 1, wherein the consent document comprises the data identifiers and the elements of status data.

11. The apparatus of claim 1, wherein:

the one or more data elements are associated with at least one of a data class or a data type;

the consent data comprises an identifier of the at least one of the data class or data type; and the consent document comprises an additional element of status data indicative of an accessibility of the one or more data elements associated with the at least one of the data class or data type.

12. A computer-implemented method, comprising:

receiving, using at least one processor, consent data from a device, the consent data identifying one or more elements of data accessible to an application program executed by the device, and the consent data comprising an application identifier of the executed application program and data identifiers of the one or more data elements;

using the at least one processor, generating a consent document for the application program based on at least a portion of the consent data, the consent document comprising elements of status data that confirm an accessibility of corresponding ones of the data elements to the executed application program;

computing, using the at least one processor, a hash value representative of the consent document; and generating and transmitting, using the at least one processor, permissioning data that includes the consent hash value to the device, the permissioning data comprising information that instructs the executed application program to store the consent hash value within a local memory of the device and to associate the consent hash value with an access token associated with the executed application program.

13. An apparatus, comprising:

a communications interface;

a memory storing instructions; and at least one processor coupled to the communications interface and to the memory, the at least one processor being configured to execute the instructions to:

receive, via the communications interface, a request for an element of data from a device, the request being generated by an application program executed at the device, and the request comprising a first consent hash value and an application identifier of the application program;

obtain a consent document associated with the application program and a second consent hash value representative of the consent document, the consent document comprising elements of status data that confirm an accessibility of corresponding ones of data elements to the executed application program;

determine that the first consent hash value corresponds to the second consent hash value, and determine that requested data element is accessible to the application program based on a corresponding one of the elements of status data associated with the requested data element;

load the requested data element from the memory and encrypt the requested data element; and transmit the encrypted data element to the device via the communications interface.

14. The apparatus of claim 13, wherein the at least one processor is further configured to:

encrypt the requested data element using a public cryptographic key associated with the executed application program; and transmit, via the communications interface, the encrypted data element to the device through a programmatic interface associated with the application program.

15. The apparatus of claim 13, wherein:

the request further comprises a first access token associated with the application program; and the at least one processor is further configured to:

based on the application identifier, access a portion of the memory that includes the consent document, the second consent hash value, and a second access token associated with the application program; and obtain the consent document, the second consent hash value, and the second access token from the accessed portion of the memory.

16. The apparatus of claim 15, wherein the at least one processor is further configured to:

establish a consistency between the first access token and the second access token; and based on the established consistency, determine that the first consent hash value corresponds to the second consent hash value, and determine that requested data element is accessible to the application program based on the corresponding one of the elements of status data.

17. The apparatus of claim 15, wherein the at least one processor is further configured to:

determine an inconsistency between the first consent hash value and the second consent hash value;

based on the determined inconsistency, perform operations that invalidate the second access token.

18. The apparatus of claim 13, wherein;

the at least one processor is further configured to:

load at least one ledger block of a distributed ledger from the memory;

based on the application identifier, access a portion of the at least one ledger block that includes the consent document and the second consent hash value associated with the application program; and obtain the consent document and the second hash value from the accessed portion of the at least one ledger block.

19. The apparatus of claim 13, wherein the at least one processor is further configured to:

determine an inconsistency between the first consent hash value and the second consent hash value;

based on the determined inconsistency, generate a message that includes the second consent hash value; and transmit, via the communications interface, the message to the device via a programmatic interface associated with the application program.

20. The apparatus of claim 13, wherein the at least one processor is further configured to:

receive consent data from the device via the communications interface, the consent data identifying one or more additional elements of data accessible to a third-party application program executed by the device;

generate a third consent document for the third-party application program based on at least a portion of the consent data and compute a third consent hash value representative of the third consent document; and generate and transmit, via the communications interface, permissioning data that includes the third consent hash value to the device, the permissioning data comprising information that instructs the executed third-party application program to store the third consent hash value within a local memory of the device and to associate the third consent hash value with a third access token associated with the executed third-party application program.

* * * * *